United States Patent
Clark et al.

(10) Patent No.: US 10,777,396 B2
(45) Date of Patent: Sep. 15, 2020

(54) DIFFERENTIAL ELECTROCHEMICAL MASS SPECTROMETRY (DEMS) CELL

(71) Applicant: The Regents of the University of California, Oakland, CA (US)

(72) Inventors: Ezra L. Clark, Berkeley, CA (US); Alexis T. Bell, Oakland, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 14/944,085

(22) Filed: Nov. 17, 2015

(65) Prior Publication Data

US 2020/0013600 A1    Jan. 9, 2020

Related U.S. Application Data

(60) Provisional application No. 62/081,535, filed on Nov. 18, 2014.

(51) Int. Cl.
*H01J 49/00* (2006.01)
*H01J 49/06* (2006.01)
*H01J 49/14* (2006.01)

(52) U.S. Cl.
CPC ........ *H01J 49/0009* (2013.01); *H01J 49/009* (2013.01); *H01J 49/065* (2013.01); *H01J 49/14* (2013.01)

(58) Field of Classification Search
CPC .... H01J 49/0009; H01J 49/009; H01J 49/065; H01J 49/14
See application file for complete search history.

(56) References Cited

PUBLICATIONS

Clark et al., "Differential Electrochemical Mass Spectrometer Cell Design for Online Quantification of Products Produced during Electrochemical Reduction of CO2". American Chemical Society, vol. 87, No. 15, pp. 8013-8020, (Jul. 8, 2015).
Hori et al., "Formation of Hydrocarbons in the Electrochemical Reduction of Carbon Dioxide at a Copper Electrode in Aqueous Solution". Journal of the Chemical Society, Faraday Transactions 1, vol. 85, No. 8, pp. 2309-2326, (Jan. 1, 1989).
Kuhl et al., "New insights into the electrochemical reduction of carbon dioxide on metalliccopper surfaces". Energy and Environmental Science, vol. 5, pp. 7050-7059, (Feb. 24, 2012).
Wasmus et al., "Reduction of Carbon Dioxide to Methane and Ethene—An On-Line MS Study With Rotating Electrodes". Electrochimica ACTA, vol. 35, No. 4, pp. 771-775, (1990).
Friebe et al., "A Real-Time Mass Spectroscopy Study of the (Electro)chemical Factors Affecting CO2 Reduction at Copper". Journal of Catalysis, vol. 168, pp. 374-385, (1997).
Kwon et al., "Combining Voltammetry with HPLC: Application to Electro-Oxidation of Glycerol". Analytical Chemistry, vol. 82, No. 13, pp. 5420-5424, (2010).
Wolter et al., "Differential Electrochemical Mass Spectroscopy (DEMS)—a New Method for the Study of Electrode Processes". Berichte der Bunsengesellschaft füur physikalische Chemie, vol. 88, pp. 2-6, (Jan. 1984).

(Continued)

*Primary Examiner* — Ciel P Contreras

(57) ABSTRACT

The present invention provides for a differential electrochemical mass spectrometry (DEMS) cell comprising a working electrode chamber configured such that an electrolyte enters the working electrode chamber through a channel running through the working electrode.

19 Claims, 24 Drawing Sheets

(56) References Cited

PUBLICATIONS

Wonders et al., "On-line mass spectrometry system for measurements at single-crystal electrodes hanging meniscus configuration". Journal of Applied Electrochemistry, vol. 36, No. 11, pp. 1215-1221, (Nov. 2006).

Grote et al., "Coupling of a scanning flow cell with online electrochemical mass spectrometry for screening of reaction selectivity". Review of Scientific Instruments, vol. 85, No. 10, pp. 104101-1-101104-5, (Oct. 7, 2014).

Baltruschat H., "Differential electrochemical mass spectrometry". Journal of the American Society for Mass Spectrometry, vol. 15, No. 12, pp. 1693-1706, (Dec. 2004).

Jusys et al., "A New Approach for Simultaneous DEMS and EQCM: Electro-oxidation of Adsorbed CO on Pt and Pt-Ru". Journal of the Electrochemical Society, vol. 146, No. 3, pp. 1093-1098, (1999).

Schouten et al., "A new mechanism for the selectivity to C1and C2 species in the electrochemical reduction of carbon dioxide on copper electrodes". Chemical Science, vol. 2, pp. 1902-1909, (Jun. 17, 2011).

Schouten et al., "Two Pathways for the Formation of Ethylene in CO Reduction on Single-Crystal Copper Electrodes". Journal of the American Chemical Society, vol. 134, pp. 9864-9867, (Jun. 6, 2012).

Schouten et al., "Structure Sensitivity of the Electrochemical Reduction of CarbonMonoxide on Copper Single Crystals". American Chemical Society Catalysis, vol. 3, No. 6, pp. 1292-1295, (May 8, 2013).

Schouten et al., "The influence of pH on the reduction of CO and CO2 to hydrocarbonson copper electrodes". Journal of Electroanalytical Chemistry, vol. 716, pp. 53-57, (2014).

Kortlever et al., "Electrochemical carbon dioxide and bicarbonate reduction on copper in weakly alkaline media". Journal of Solid State Electrochemistry, vol. 17, No. 7, pp. 1843-1849, (May 9, 2013).

Reske et al., "Controlling Catalytic Selectivities during CO2 Electroreduction on Thin Cu Metal Overlayers". Journal of Physical Chemistry Letters, vol. 4, No. 15, pp. 2410-2413 (Jul. 9, 2013).

Kas et al., "Electrochemical CO2 reduction on Cu2O-derived copper nanoparticles: controlling the catalytic selectivity of hydrocarbons". Journal of Physical Chemistry Chemical Physics, vol. 16, No. 24, pp. 12194-12201, (Apr. 29, 2014).

Hartung et al., "Differential Electrochemical Mass Spectrometry Using Smooth Electrodes: Adsorption and H/D-Exchange Reactions of Benzene on Pt". Langmuir, vol. 6., pp. 953-957, (1990).

Ashton S.J., "Design, Construction and Research Application of a Differential Electrochemical Mass Spectrometer (DEMS)". Springer Thesis, Berlin Heidelberg, pp. 1-111, (2012).

Noda et al., "Potential Dependencies of the Products on Electrochemical Reduction of Carbon Dioxide at a Copper Electrode". Chemistry Letters, vol. 18, No. 2, pp. 289-292, (1989).

$H_2$ (m/z = 2) in $N_2$ sparged 0.1 M $KHCO_3$
1 mV/s, 2,000 µL/min
Emission: 500 SEM: 900 Fast

Electrolyte Velocity (m/s)

Electrolyte Velocity (m/s)

DIFFERENTIAL ELECTROCHEMICAL MASS SPECTROMETRY (DEMS) CELL

RELATED PATENT APPLICATIONS

The application claims priority to U.S. Provisional Patent Application Ser. No. 62/081,535, filed Nov. 18, 2014; which is incorporated herein by reference.

STATEMENT OF GOVERNMENTAL SUPPORT

The invention was made with government support under Contract Nos. DE-AC02-05CH11231 and DE-SC0004993 awarded by the U.S. Department of Energy. The government has certain rights in the invention.

FIELD OF THE INVENTION

The present invention is in the field of differential electrochemical mass spectrometry (DEMS).

BACKGROUND OF THE INVENTION

The electrochemical $CO_2$ reduction reaction ($CO_2RR$) is a subject of considerable current interest that is motivated by the desire to develop methods for converting atmospheric $CO_2$ to fuels using electrical energy generated from renewable sources such as wind and solar power. However, commercial implementation of the $CO_2RR$ has yet to be realized, primarily due to challenges associated with electrocatalyst activity and selectivity. The reaction requires approximately 800 mV of overpotential to produce hydrocarbons and alcohols (Hori, Y., Takahashi, R., Yoshinami, Y. & Murata, A. Electrochemical Reduction of CO at a Copper Electrode. *J. Phys. Chem. C* 101, 7075-7081 (1997); Durand, W. J., Peterson, A. A., Studt, F., Abild-Pedersen, F. & Nørskov, J. K. Structure effects on the energetics of the electrochemical reduction of CO2 by copper surfaces. *Surf Sci.* 605, 1354-1359 (2011); Li, C. W. & Kanan, M. W. $CO_2$ reduction at low overpotential on Cu electrodes resulting from the reduction of thick $Cu_2O$ films. *J. Am. Chem. Soc.* 134, 7231-4 (2012); Peterson, A. A., Abild-Pedersen, F., Studt, F., Rossmeisl, J. & Nørskov, J. K. How copper catalyzes the electroreduction of carbon dioxide into hydrocarbon fuels. *Energy Environ. Sci.* 3, 1311 (2010); Tang, W. et al. The importance of surface morphology in controlling the selectivity of polycrystalline copper for CO2 electroreduction. *Phys. Chem. Chem. Phys.* 14, 76-81 (2012)), resulting in an overall energy conversion efficiency for the cathodic process of roughly 45%. Moreover, the reaction can produce up to 16 different products depending on the composition of the electrocatalyst and the applied potential (Kuhl, K. P., Cave, E. R., Abram, D. N. & Jaramillo, T. F. New insights into the electrochemical reduction of carbon dioxide on metallic copper surfaces. *Energy Environ. Sci.* 5, 7050-7059 (2012)). This lack of selectivity results in additional processing costs associated with product separations, which further reduce the cost-effectiveness of the technology. For these reasons there is a great deal of interest in the discovery and development of catalysts for the selective formation of potential fuels by the reduction of $CO_2$. Since the reaction produces a mixture of gaseous and liquid phase products, a combination of analytical techniques must be employed to fully characterize electrocatalyst activity and selectivity at a given potential. Gaseous products are typically analyzed via gas chromatography by sampling the electrochemical cell headspace in-situ while liquid phase products are analyzed using either liquid chromatography or nuclear magnetic resonance ex-situ (Kuhl, et al. (2012); Hori, Y., Murata, A. & Takahashi, R. Formation of Hydrocarbons in the Electrochemical Reduction of Carbon Dioxide at a Copper Electrode in Aqueous Solution. *J. Chem. Soc. Faraday Trans.* 1 85, 2309-2326 (1989)). However, because many of the minor products are produced with Faradaic efficiencies of less than 5%, constant potential electrolysis must be carried out for roughly one hour in order to reach the analytical detection limits of these techniques. As a consequence, there is considerable interest in the development and implementation of an analytical technique that can be used for on-line characterization of the products of the $CO_2RR$ Differential electrochemical mass spectrometry (DEMS) is an analytical technique that combines an electrochemical half-cell experiment with mass spectrometry, uniting the two with a pervaporation membrane (Wolter, O. & Heitbaum, J. Differential Electrochemical Mass Spectroscopy (DEMS)-. *Berichte der Bunsengesellschaft für Phys. Chemie* 6, 2-6 (1984)). Because the analysis time of mass spectrometry is on the order of a second, the formation of gaseous or volatile reaction products can be monitored continuously in-situ. By relating the relevant mass ion currents to the Faradaic efficiencies of the various reaction products, the activity and selectivity of a given electrocatalyst can be studied in real time as a function of the applied potential. This ultimately enables the potential dependence and transient nature of the reaction selectivity to be rapidly screened.

The efficacy of DEMS is heavily reliant on the design of the electrochemical cell, which must be capable of achieving both a rapid response time and a high product collection efficiency (Baltruschat, H. Differential electrochemical mass spectrometry. *J. Am. Soc. Mass Spectrom.* 15, 1693-706 (2004)). As a result, electrochemical cells are specially designed for this application. There are also additional design criteria that need to be met. The working and counter electrodes should be parallel in order to ensure that the current density does not vary as a function of position on the electrode surface. If this design criterion is not met then the partial current of a given product will vary across the electrode surface, making it impossible to make accurate conclusions about the reaction selectivity at a given potential. Another design constraint is that the electrodes should be spatially separated by either a proton or anion-conducting membrane. If the electrodes are not spatially separated, it is possible that Faradaic current from oxygen reduction can occur while studying $CO_2RR$ electrocatalysts. The amount of Faradaic current from this unwanted reaction cannot be quantified since the only product is water. In the absence of spatial separation of the electrodes, products formed at the cathode can undergo oxidation at the anode thereby reducing the concentration of products that can be detected. Yet another design constraint is that the cross sectional area of electrolyte between the working and counter electrodes should be large. This will result in a low cell impedance and reduce the propensity of bubble formation to break the electrical continuity of the electrolyte between the electrodes. Since the $CO_2RR$ can become diffusion limited in stagnant electrolytes in less than three minutes at 10 $mA/cm^2$, electrolyte convection must be used to study a given electrocatalysts true activity and selectivity for this reaction. As a result, the volume of electrolyte between the working electrode and the pervaporation membrane should be small so that the delay time between product generation and detection can be minimized. If the cell volume is allowed to be excessively large then the electrolyte flow rate will also have to be excessively large in order to achieve acceptable delay times. This is an issue because excessively high electrolyte flow rates will result in product dilution and reduced detectability. Finally, the surface area of the working electrode should be large so that the concentration of reaction products can be maximized.

DEMS cell designs described in the literature suffer from a variety of drawbacks including non-parallel electrode configurations, high impedances, and reactant diffusion limitations. The first DEMS cell to use electrolyte flow was the thin-layer flow cell (Hartung, T. & Baltruschat, H. Differential Electrochemical Mass Spectrometry Using Smooth Electrodes: Adsorption and H/D-Exchange Reactions of Benzene on Pt. *Langmuir* 6, 953-957 (1990)). This cell geometry consisted of a thin layer of electrolyte, approximately 100 microns thick, that separated the working electrode and the pervaporation membrane. This cell geometry suffers from a low product collection efficiency because products generated near the electrolyte outlet are swept out of the chamber before mass transport to the pervaporation membrane can occur. Furthermore, the non-parallel electrode configuration makes it impossible to study the reaction selectivity. To solve the issues of low product collection efficiency the dual thin-layer flow cell was developed (Jusys, Z., Kaiser, J. & Behm, R. J. A novel dual thin-layer flow cell double-disk electrode design for kinetic studies on supported catalysts under controlled mass-transport conditions. *Electrochim. Acta* 49, 1297-1305 (2004)). This cell geometry locates the working electrode and the pervaporation membrane in separate chambers, connected by four transfer capillaries. While this cell geometry achieves higher collection efficiencies, it suffers from a non-parallel electrode configuration and restrictive pathways for ion conduction. A modified version of the DEMS instrument has also been developed recently that enables online product analysis from a traditional H-cell (Wonders, A. H., Housmans, T. H. M., Rosca, V. & Koper, M. T. M. On-line mass spectrometry system for measurements at single-crystal electrodes in hanging meniscus configuration. *J. Appl. Electrochem.* 36, 1215-1221 (2006)). This approach employs a capillary tube with a porous Teflon tip, which is brought within 20 microns of the electrode surface in order to sample products formed by the $CO_2RR$. While this geometry enables the use of a parallel electrode configuration it also makes product quantification impossible because the collection efficiency is extremely low and highly dependent on the precise orientation of the porous Teflon tip with respect to the electrode surface. Furthermore, the trends mass spectrometer ion currents do not properly reflect the trends in the partial currents of the different reaction products because of mass transport limitations caused by the close proximity of the sampling tip to the surface of the working electrode.

SUMMARY OF THE INVENTION

The present invention provides for a differential electrochemical mass spectrometry (DEMS) cell comprising a working electrode chamber and a working electrode configured such that an electrolyte enters the working electrode chamber through a channel running through the working electrode. In some embodiments, the working electrode comprises a washer-shape and the channel is at the center of the washer-shaped working electrode.

In some embodiments, the DEMS cell comprises a first electrolyte inlet in fluid communication with a first electrode chamber which is in turn in fluid communication with and a first electrolyte outlet, a second electrolyte inlet in fluid communication with a second electrode chamber which is in turn in fluid communication with and a second electrolyte outlet, a first electrode comprising a first surface exposed to the first electrode chamber, a second electrode comprising a second surface exposed to the second electrode chamber, and a first membrane transposed between the first electrode chamber and the second electrode chamber, wherein the first electrode chamber is a working electrode chamber configured such that the first electrolyte enters the working electrode chamber through a channel running through the first electrode, or the second electrode chamber is a working electrode chamber configured such that the second electrolyte enters the working electrode chamber through a channel running through the second electrode.

When the DEMS cell is in operation, the first electrolyte flows from an outside source of the first electrolyte into the DEMS cell in a direction from the first electrolyte inlet to the first electrode chamber to the first electrolyte outlet, and then out of the DEMS cell. When the DEMS cell is in operation, the second electrolyte flows from an outside source of the second electrolyte into the DEMS cell in a direction from the second electrolyte inlet to the second electrode chamber to the second electrolyte outlet, and then out of the DEMS cell.

In some embodiments, the DEMS cell comprises the structure shown in FIG. 1A. 1 is the first electrolyte inlet, 2 is the first electrode chamber, 3 is the first electrolyte outlet, 4 is the second electrolyte inlet, 5 is the second electrode chamber, 6 is the second electrolyte outlet, 7 is the second electrode, 8 is the first electrode, 9 is the first membrane, 10 is the second membrane, 11 is a stainless steel frit, 12 is the body (of the DEMS cell), 13 is a third chamber, 14 is the direction of flow of the first electrolyte into the DEMS cell, 15 is the direction of flow of the first electrolyte out of the DEMS cell, 16 is the direction of flow of the second electrolyte into the DEMS cell, 17 is the direction of flow of the second electrolyte out of the DEMS cell, 18 is a transfer capillary, 19 is the first surface of the first electrode exposed to the first electrode chamber, 20 is the second surface of the second electrode exposed to the second electrode chamber, and 21 is the channel running through the second electrode 7 or working electrode. The stainless steel frit 11 is porous to water. During the operation of the DEMS cell, the flow of fluid from channel 21 through the second electrode chamber 5 to the transfer capillary 18 is able to sweep away bubbles that form on second surface 20 of the second electrode exposed to the second electrode chamber. The second membrane 10 is hydrophobic and blocks movement of water molecules but permits movement of gas through the second membrane 10.

In some embodiments, the first electrolyte is an anolyte and the first electrode is an anode, and the second electrolyte is a catholyte and the second electrode is a cathode. In some embodiments, the working electrode chamber is the cathode chamber, and the working electrode is the cathode. In some embodiments, the anode is a platinum anode, or Pt black anode. In some embodiments, the cathode is a copper cathode. In some embodiments, the first membrane is an ion-conducting membrane, such as an anion-conducting membrane. In some embodiments, the second membrane is a pervaporation membrane. In some embodiments, the second electrode is the working electrode, and/or the second electrolyte chamber is the working electrode chamber.

In some embodiments, the DEMS cell comprises the structure shown in FIG. 1B. This DEMS cell is identical to the DEMS cell shown in FIG. 1A except that it further comprises of three structures: 22 is a hollow screw that fixes second electrode 7 to the body 12 of the DEMS cell. The hollow screw 22 has a channel 21 running through the hollow screw 22 and also through the second electrode 7 or working electrode. 23 is a reference electrode which is located at the angle formed between channel 21 and second electrolyte inlet 4, or the base of hollow screw 22. 24 is a gold pin which makes electrical contact between second electrode 7 and a means of electrical communication to the outside of the DEMS cell, such as an electrical wire.

In some embodiments, the DEMS cell further comprises one or more other features described herein and/or in FIG. 1A, 1B, 1C, or 1D.

In some embodiments, the second surface is about 0.5 $cm^2$ to about 2 $cm^2$. In some embodiments, the second surface is about 0.75 $cm^2$ to about 1.5 $cm^2$. In some embodiments, the second surface is about 0.9 $cm^2$ to about 1.1 $cm^2$. In some embodiments, the second surface is about 1 $cm^2$. In some embodiments, the washer-shaped working electrode comprises an exposed surface area of about 0.5 $cm^2$ to about 2 $cm^2$. In some embodiments, the washer-shaped working electrode comprises an exposed surface area of about 0.75 $cm^2$ to about 1.5 $cm^2$. In some embodiments, the washer-shaped working electrode comprises an exposed surface area of about 0.9 $cm^2$ to about 1.1 $cm^2$. In some embodiments, the washer-shaped working electrode comprises an exposed surface area of about 1 $cm^2$.

In some embodiments, the total volume of the working electrode chamber is less than about 40 μL. In some embodiments, the total volume of the working electrode chamber is less than about 30 μL. In some embodiments, the total volume of the working electrode chamber is less than about 20 μL. In some embodiments, the total volume of the working electrode chamber is less than about 15 μL. In some embodiments, the total volume of the working electrode chamber is less than about 10 μL.

In some embodiments, the shortest or average distance from the working electrode to the first membrane is at most about 200 μm, 175 μm, 150 μm, 125 μm, 100 μm, 75 μm, 50 μm, 25 μm, or 10 μm, or the shortest or average distance from the working electrode to the first membrane is a distance from about any two of the distances described herein, such as from about 10 μm to about 200 μm.

In a particular embodiment, the DEMS cell has one of the configurations depicted in FIGS. 1A to 1D. A novel feature of the DEMS cell is that the DEMS is configured such that an electrolyte enters the working electrode chamber through the center of a washer-shaped working electrode with a suitable exposed surface area, such as 1 $cm^2$. The electrolyte rapidly reaches the proton or anion-conducting membrane, which is separated from the working electrode by a thin layer of electrolyte 100 microns thick. The electrolyte then flows laterally outwards toward the four transfer capillaries. The total volume of the working electrode chamber is less than 20 μL. The reference electrode is introduced into the cell through a capillary port and is positioned roughly 1 mm from the working electrode. Details of the working electrode chamber are shown in FIG. 2. A third chamber, housing the counter electrode, is located above the working electrode chamber, ensuring a parallel electrode configuration. The surface area of the proton or anion-conducting membrane between the two electrodes is roughly 1.75 $cm^2$. A novel feature of this design is the washer-shaped working electrode. The cell design shown in FIGS. 1A to 1D enables a parallel electrode configuration to be used and ensures attainment of a low transit time from the working electrode chamber to the collection chamber. Initial tests of the cell performance have been extremely promising and are shown in FIGS. 3A to 3G.

In some embodiments, operating the DEMS cell produces results at least equal to or better than the results described herein.

The hydrogen evolution reaction (HER) data obtained using a copper working electrode is shown in FIGS. 3A and 3B. The first plot proves that the DEMS cell geometry does not affect the current-voltage characteristics of the cathode, since the voltammogram obtained in the DEMS cell matches that obtained in a conventional bulk electrolysis cell. The bottom plot shows that the ion current for $H_2$ recorded a mass spectrometer is fully consistent with voltammogram, from which it is deduced that the cell exhibits a 100% Faradaic efficiency for the formation of $H_2$. The second set of plots depicts the results obtained during electrochemical $CO_2$ reduction. In this case, mass spectra were observed for $H_2$, $CH_4$ and $C_2H_4$, the principal products expected for $CO_2$ reduction over Cu. A signal at m/z=31 is also seen that is attributable to the formation of alcohols (methanol and ethanol).

The DEMS cell of the present invention can be used in any of the following applications: analyzing the products of the $CO_2RR$, and other electrochemical processes, such as the electrochemical synthesis of organic molecules and the electrochemical reforming of an organic solvent/gas (such as methanol) to synthesis gas.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION OF THE INVENTION

Figure 1A:
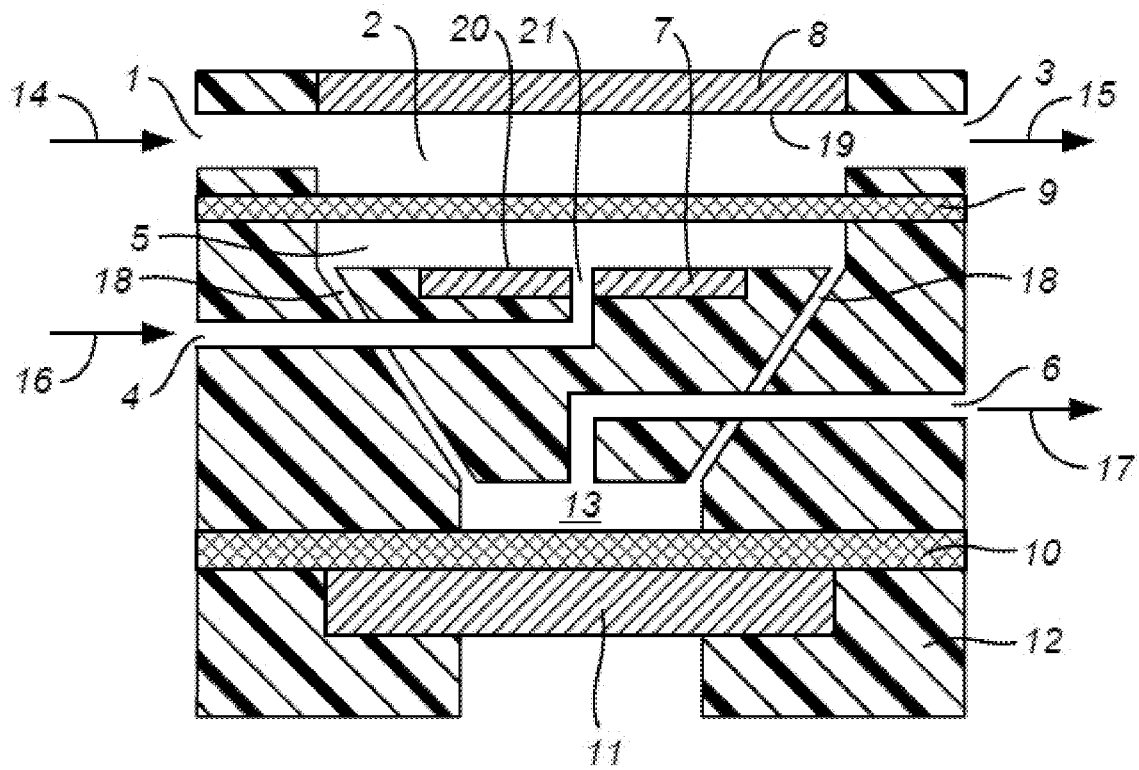
FIG. 1A shows a schematic of an embodiment of the DEMS cell.
Figure 1B:
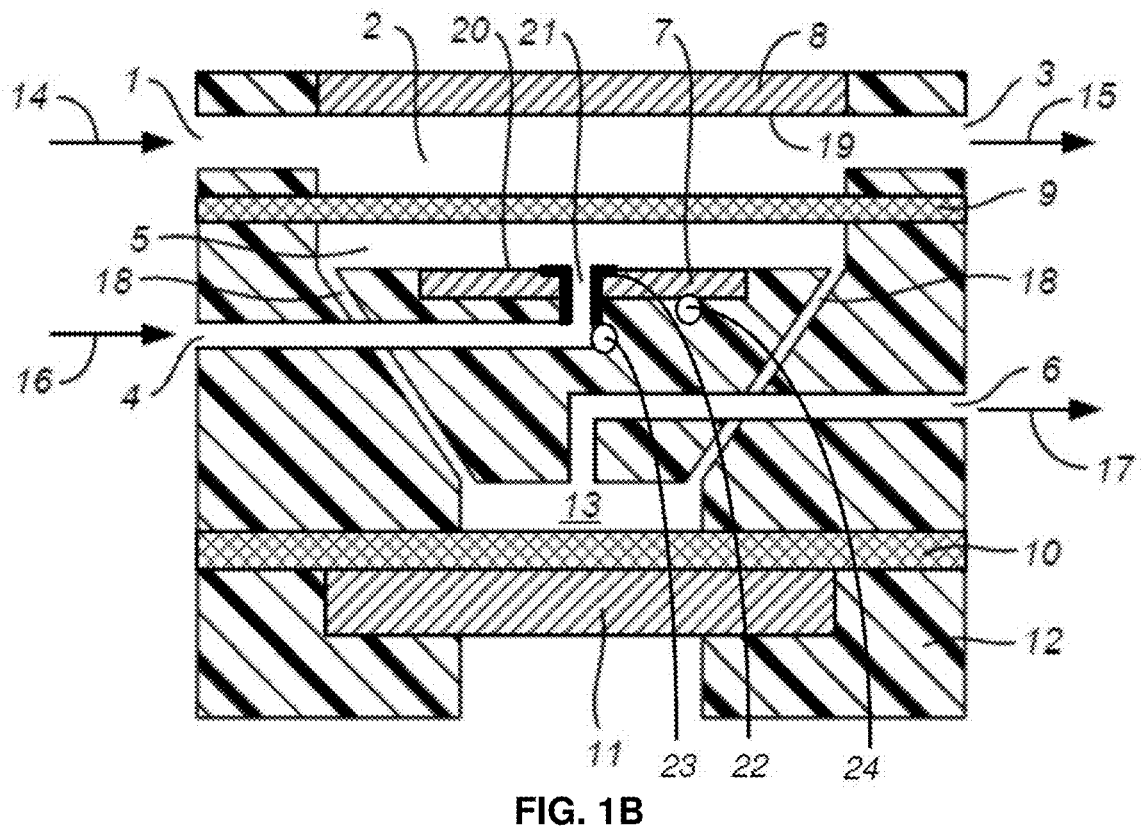
FIG. 1B shows a schematic of another embodiment of the DEMS cell.
Figure 1C:
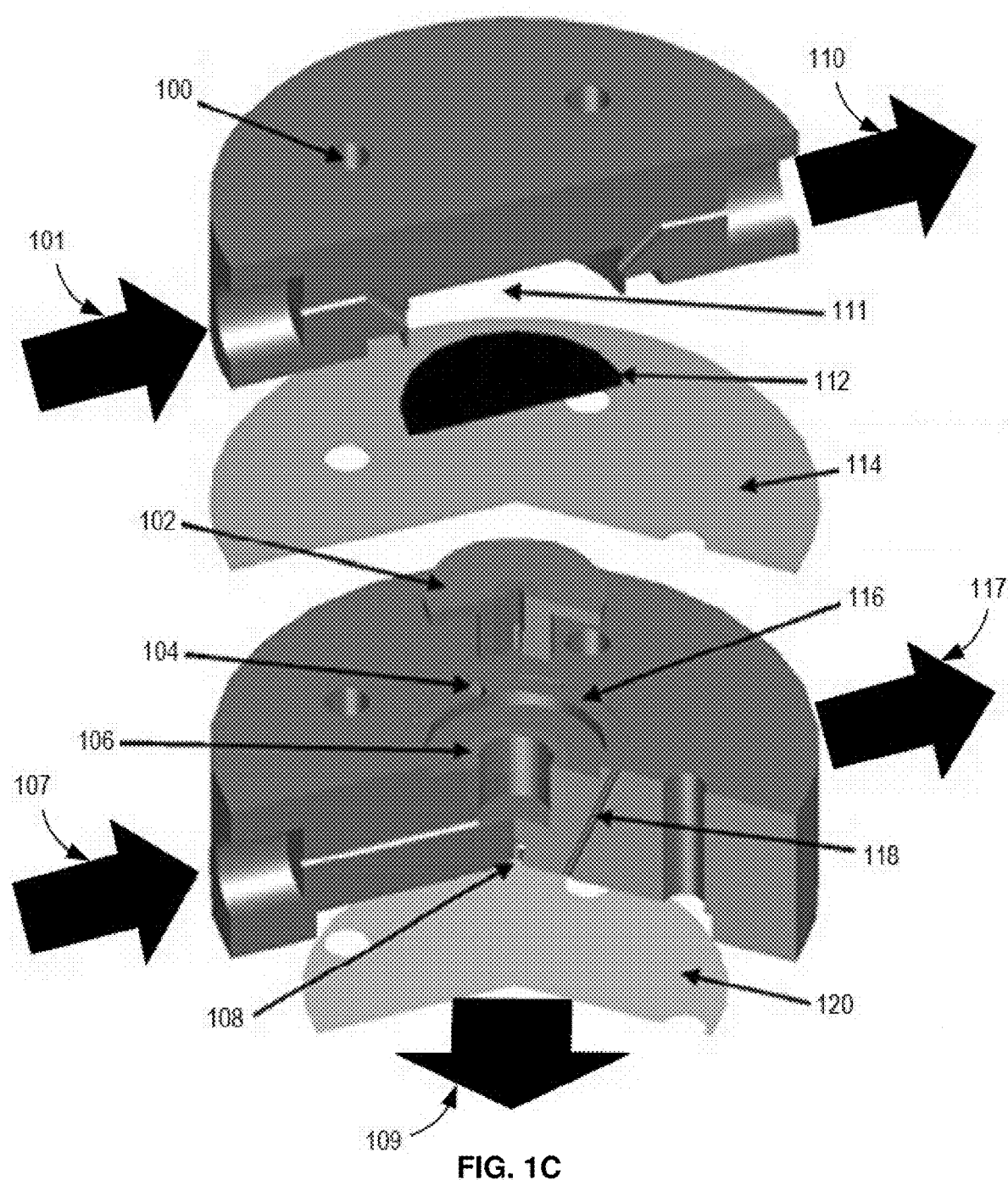
FIG. 1C shows a schematic of a further embodiment of the DEMS cell. 100: Mounting Screw Holes. 101: Anolyte Inlet. 102: Removable Cu Cathode. 104: Reference Electrode Port. 106: Cathode Receptacle. 107: Catholyte Inlet. 108: Collection Chamber. 109: To MS. 110: Anolyte Outlet. 111: Anode Chamber. 112: Pt Black Anode. 114: Anion Conducting Membrane. 116: Cathode Chamber. 117: Catholyte Outlet. 118: Transfer Capillary (1 of 4). 120: Teflon Membrane.
Figure 1D:
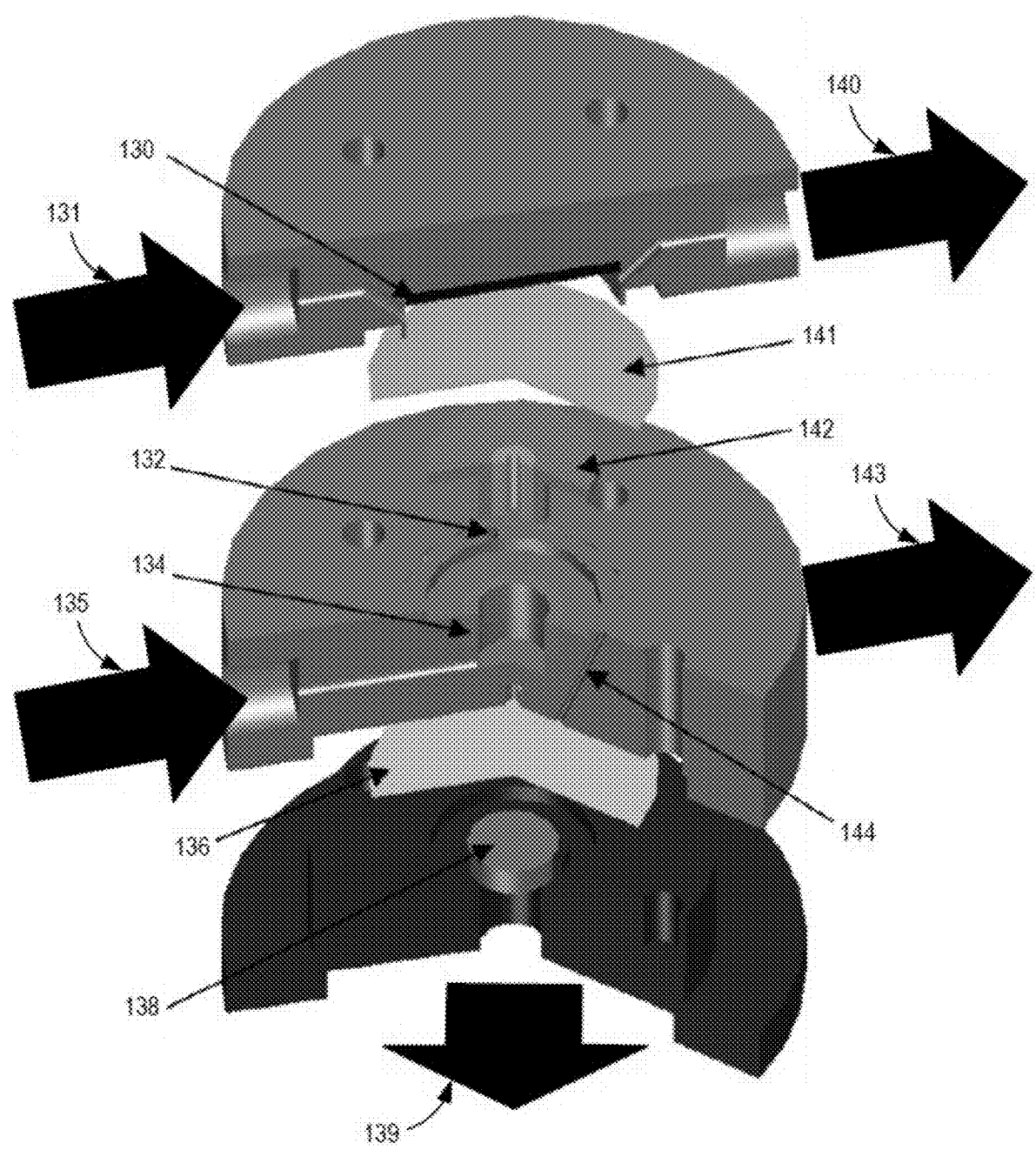
FIG. 1D shows a schematic of an even further embodiment of the DEMS cell. 130: Counter Electrode. 131: Anolyte Inlet. 132: Reference Electrode. 134: Cathode Receptacle. 135: Catholyte Inlet. 136: Pervaporation Membrane. 138: Stainless Steel Frit. 139: To MS. 140: Anolyte Outlet. 141: Ion-Conducting Membrane. 142: Washer Working Electrode. 143: Catholyte Outlet. 144: Transfer Capillary (1 of 4).

Before the present invention is described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

As used in the specification and the appended claims, the singular forms "a", "an", and "the" include plural references unless the context clearly dictates otherwise. Thus, for example, reference to an "electrolyte" includes a single electrolyte as well as a plurality of electrolytes.

The terms "optional" or "optionally" as used herein mean that the subsequently described feature or structure may or may not be present, or that the subsequently described event or circumstance may or may not occur, and that the description includes instances where a particular feature or structure is present and instances where the feature or structure is absent, or instances where the event or circumstance occurs and instances where it does not.

These and other objects, advantages, and features of the invention will become apparent to those persons skilled in the art upon reading the details of the invention as more fully described below.

The electrochemical $CO_2$ reduction reaction ($CO_2RR$) is a subject of considerable current interest that is motivated by the desire to develop methods for converting atmospheric $CO_2$ into fuels using electrical energy generated from renewable sources[1]. Commercial implementation of the $CO_2RR$ has yet to be realized, primarily due to challenges associated with electrocatalyst activity and selectivity. Copper has been identified as the only metallic electrocatalyst capable of reducing $CO_2$ to hydrocarbons and alcohols.[2,3] However, the reaction requires an overpotential of ~800 mV,[4-8] resulting in an overall energy conversion efficiency for the $CO_2RR$ process of ~20%. Moreover, the reaction can produce up to 16 different products depending on the composition of the electrocatalyst and the applied potential[9]. This lack of selectivity necessitates additional processing costs associated with product separations, which further reduce the cost-effectiveness of the technology. For this reason there is a great deal of interest in the discovery of electrocatalysts for the selective formation of potential fuels by the reduction of $CO_2$.

Figure 4A:
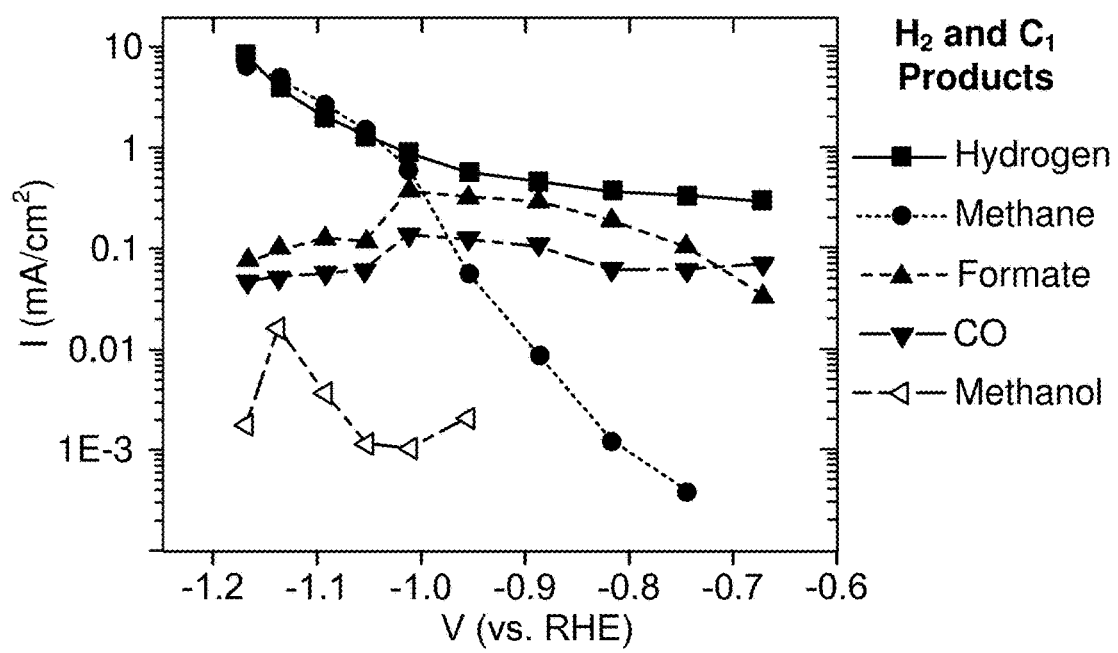
FIG. 4A shows the partial current densities of the $CO_2RR$ products obtained on metallic copper.
Figure 4B:
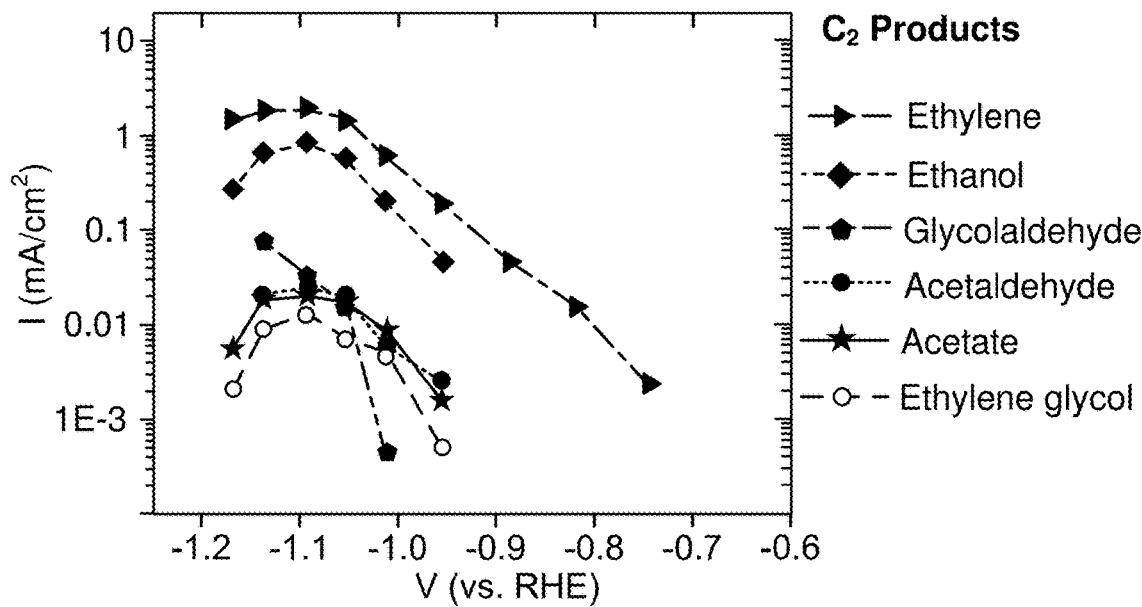
FIG. 4B shows the partial current densities of the $CO_2RR$ products obtained on metallic copper.
Figure 4C:
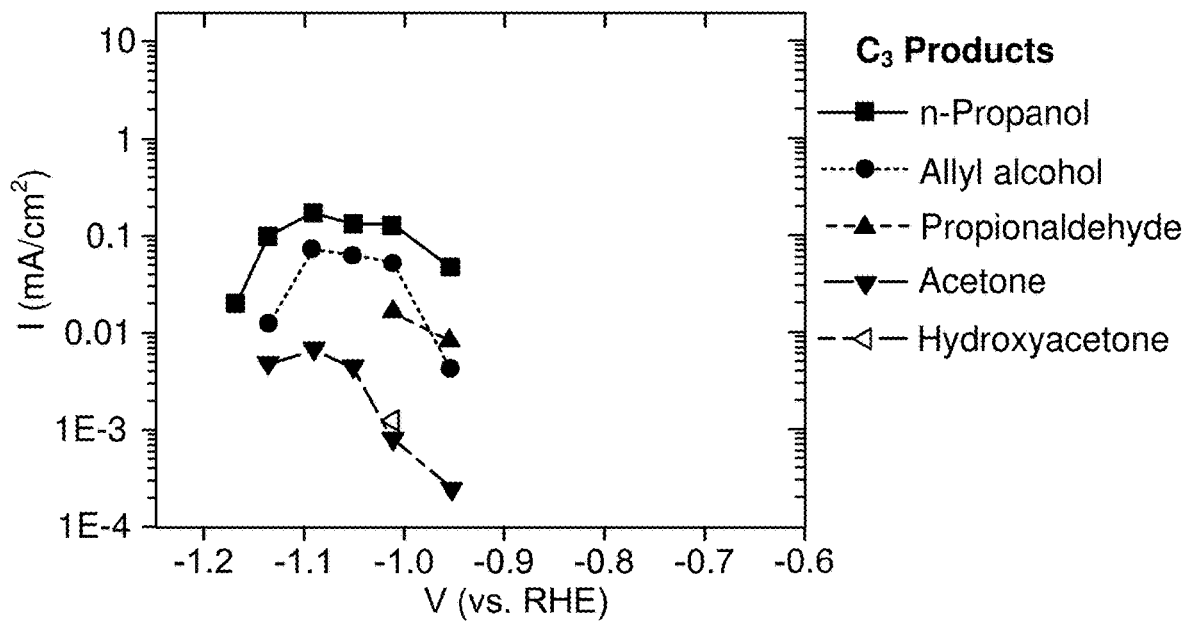
FIG. 4C shows the partial current densities of the $CO_2RR$ products obtained on metallic copper.

Solvated $CO_2$ molecules are believed to be the electroactive species since no $CO_2RR$ products have been detected in electrolyzed solutions of $KHCO_3$ and $K_2CO_3$ in $CO_2$-free atmospheres[10]. At relatively low overpotentials metallic copper reduces $CO_2$ to both formic acid and carbon monoxide (CO), as shown in FIGS. 4A to 4C.[9] The unique ability of copper to catalyze the reduction of $CO_2$ to hydrocarbons and alcohols has been attributed to the moderate strength of CO adsorption to the copper surface.[4,11-13] Since the same distribution of products are obtained from CO reduction (CORR) and $CO_2RR$ on metallic copper,[14,15] CO is considered to be an intermediate in the pathway to more reduced products. The overpotential determining step in the production of hydrocarbons and alcohols from $CO_2$ occurs after the formation of CO since the same overpotential is required to produce hydrocarbons and alcohols via CORR.[14,15] Formic acid has been shown experimentally to be a dead-end intermediate at the potentials relevant to $CO_2RR$ on metallic copper.[16-21] The formation rates of methane and ethylene are known to be dictated by different rate-determining steps, as indicated by their differing Tafel slopes and partial current proton concentration dependance.[4] Furthermore, all $C_{2+}$ products are believed to share a common intermediate since their generation rates all follow a common potential dependence, as depicted in FIGS. 4A to 4C.[9] Interestingly, metallic copper is highly inefficient at generating methanol, with a maximum Faradaic efficiency of less than 0.5%.[9] This is surprising considering that polycrystalline copper produces ethanol and n-propanol with Faradaic efficiencies of 10% and 3%, respectively, at −1.1 V vs RHE.[9] These results suggest that methanol is produced via a separate reaction pathway with a large kinetic barrier, causing $CO_2RR$ to favor the formation of other products which are produced via more facile reaction steps.[9]

Since the $CO_2RR$ produces a mixture of gaseous and liquid phase products a combination of analytical techniques must be employed to fully characterize electrocatalyst selectivity at a given potential. Gaseous products are typically analyzed via gas chromatography by sampling the headspace of the electrochemical cell in-situ while liquid products are analyzed using either liquid chromatography or nuclear magnetic resonance ex-situ.[9,20] However, since the Faradaic efficiencies of the liquid phase products are typically less than 5%,[9] constant potential electrolysis must be carried out for roughly one hour in order to reach the analytical detection limits of these techniques. Currently the transient selectivity of a given electrocatalyst cannot be quantitatively studied in a continuous manner. This is an issue because this reaction is known to be highly sensitive to deactivation.[22] Thus, there is considerable interest in the development of an analytical technique capable of continuous quantification of the products of the $CO_2RR$. Such a technique could be employed to more effectively characterize the transient methanol selectivity of $Cu_2O$ films. Differential electrochemical mass spectrometry (DEMS) is an analytical technique that combines an electrochemical half-cell experiment with mass spectrometry, uniting the two with a pervaporation membrane.[23] Because the analysis time of mass spectrometry is on the order of a second, the formation of gaseous or volatile reaction products can be monitored continuously in-situ. By relating the relevant mass ion currents to the Faradaic efficiencies of the various reaction products, the activity and selectivity of a given electrocatalyst can be studied in real time as a function of the applied potential. This ultimately enables the potential dependence and transient nature of the reaction selectivity to be rapidly analyzed.

The efficacy and capabilities of DEMS strongly depends on the design of the electrochemical cell, which must be capable of achieving both a rapid response time and a high product collection efficiency.[24] As a result, electrochemical cells are specially designed to meet these criteria. However, several additional design criteria must also be met to ensure meaningful product quantification. The working (WE) and counter electrodes (CE) should be parallel in order to ensure that the applied potential does not vary as a function of position on the electrode surface. If this design criterion is not met then the partial current of a given product will vary across the electrode surface, making it impossible to make accurate conclusions about the reaction selectivity. The electrodes should be spatially separated by an ion-conducting membrane in order to ensure that products formed at the cathode do not undergo oxidation at the anode, thereby reducing the perceived selectivity of a given electrocatalyst. Furthermore, this prevents Faradaic current from $O_2$ reduction at the WE. Yet another design constraint is that the cross sectional area of electrolyte separating the WE and CE should be large, which will result in a low cell impedance and reduce the propensity of bubble formation to break the electrical continuity between the electrodes. Since the $CO_2RR$ can become diffusion limited in stagnant electrolytes in less than three minutes at potentials lower than −1.1

V vs RHE, electrolyte convection must be employed to study a given electrocatalysts transient selectivity over longer timescales. As a result, the volume of electrolyte between the WE and the pervaporation membrane should be minimized so that the transit time between them can be reduced. If the cell volume is not minimized then excessively high electrolyte flow rates will have to be employed to attain acceptable transit times, resulting in product dilution and reduced detectability. Finally, the surface area of the WE should be large so that the concentration of reaction products can be maximized.

Figure 5A:
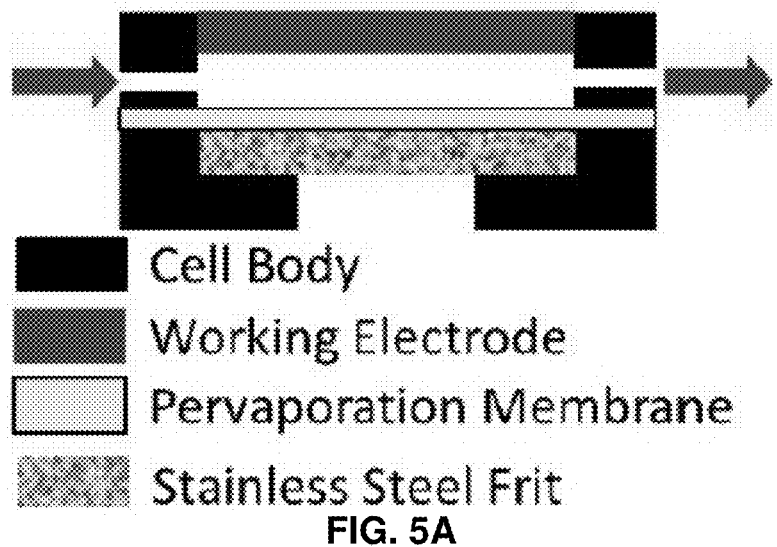
FIG. 5A shows a schematic of DEMS cell designs described in the current literature.
Figure 5B:
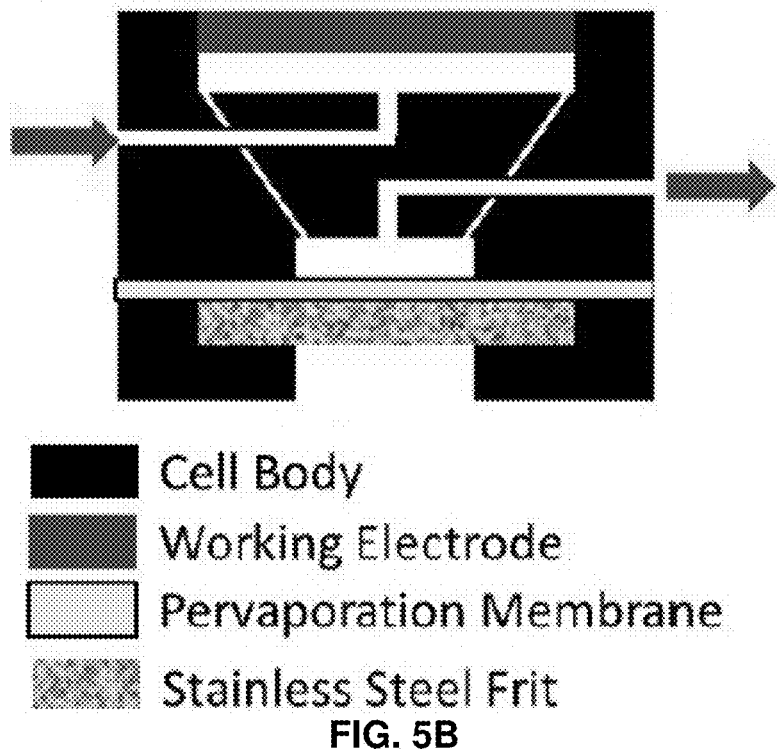
FIG. 5B shows a schematic of DEMS cell designs described in the current literature.

DEMS cell designs described in the literature preclude product quantification as a consequence of non-parallel electrode configurations, low product collection efficiencies, and reactant diffusion limitations. The first DEMS cell to use electrolyte flow was the thin-layer flow cell, depicted in FIGS. 5A and 5B.[25] This cell geometry consists of a thin layer of electrolyte, approximately 100 μm thick, separating the WE and the pervaporation membrane. This cell geometry suffers from a low product collection efficiency because products generated near the electrolyte outlet are swept out of the chamber before mass transport to the pervaporation membrane can occur. The counter electrode is connected to the outlet capillary, resulting in an extremely high cell resistance. This excessively high resistance results in working electrode potential instability, which is solved by adding another counter electrode at the inlet. However, this practice has unknown effects on the system and complicates accurate referencing of the WE potential.[26] To solve the issue of low product collection efficiency the dual thin-layer flow cell was developed.[27] This cell geometry locates the WE and the pervaporation membrane in separate chambers, which are connected by four transfer capillaries. While this cell geometry achieves higher collection efficiency, it still suffers from a non-parallel electrode configuration and restrictive pathways for ion conduction. A modified version of the DEMS instrument has also been recently developed that enables online product analysis from a traditional H-cell[28]. This approach employs a capillary tube with a porous Teflon tip, which is brought within 20 microns of the electrode surface in order to sample products formed by the $CO_2RR$. While this geometry enables the use of a parallel electrode configuration it also makes product quantification impossible because the collection efficiency is extremely low and highly dependent on the precise orientation of the porous Teflon tip with respect to the electrode surface. Thus, we conclude that the DEMS cell designs described in the literature are not capable of product quantification or detecting the liquid phase products of the $CO_2RR$. Therefore, we were motivated to undertake the design and construction of a novel DEMS cell that would enable quantification of products and determination of Faradaic efficiencies in a continuous fashion. Since this technique is not capable of detecting all the minor products of $CO_2RR$ it will be coupled with gas chromatography (GC) and high performance liquid chromatography (HPLC) to close the carbon balance. By combining the merits of these analytical techniques a clear picture of the activity, selectivity, and stability of a given electrocatalysts will be constructed.

REFERENCES CITED

1. Whipple, D. T. & Kenis, P. J. A. Prospects of CO2 Utilization via Direct Heterogeneous Electrochemical Reduction. *J. Phys. Chem. Lett.* 1, 3451-3458 (2010).
2. Hori, Y., Kikuchi, K. & Suzuki, S. Production of CO and CH4 in Electrochemical Reduction of CO2 at Metal Electrodes in Aqueous Hydrogencarbonate Solution. *Chem. Lett.* 1695-1698 (1985).
3. Hori, Y., Wakebe, H., Tsukamoto, T. & Koga, O. Electrocatalytic process of CO selectivity in electrochemical reduction of CO2 at metal electrodes in aqueous media. *Electrochim. Acta* 39, 1833-1839 (1994).
4. Hori, Y., Takahashi, R., Yoshinami, Y. & Murata, A. Electrochemical Reduction of CO at a Copper Electrode. *J. Phys. Chem. C* 101, 7075-7081 (1997).
5. Durand, W. J., Peterson, A. A., Studt, F., Abild-Pedersen, F. & Nørskov, J. K. Structure effects on the energetics of the electrochemical reduction of CO2 by copper surfaces. *Surf. Sci.* 605, 1354-1359 (2011).
6. Li, C. W. & Kanan, M. W. CO2 reduction at low overpotential on Cu electrodes resulting from the reduction of thick Cu2O films. *J. Am. Chem. Soc.* 134, 7231-4 (2012).
7. Peterson, A. A., Abild-Pedersen, F., Studt, F., Rossmeisl, J. & Nørskov, J. K. How copper catalyzes the electroreduction of carbon dioxide into hydrocarbon fuels. *Energy Environ. Sci.* 3, 1311 (2010).
8. Tang, W. et al. The importance of surface morphology in controlling the selectivity of polycrystalline copper for CO2 electroreduction. *Phys. Chem. Chem. Phys.* 14, 76-81 (2012).
9. Kuhl, K. P., Cave, E. R., Abram, D. N. & Jaramillo, T. F. New insights into the electrochemical reduction of carbon dioxide on metallic copper surfaces. *Energy Environ. Sci.* 5, 7050-7059 (2012).
10. Kim, J. J., Summers, D. P., Frese, K. W. & Park, M. Reduction of CO2 and CO to Methane on Cu Foil Electrodes. *J. Electroanal. Chem.* 245, 223-244 (1988).
11. Hori, Y. et al. Adsorption of Carbon Monoxide at a Copper Electrode Accompanied by Electron Transfer Observed by Voltammetry and IR Spectroscopy. *Electrochim. Acta* 39, 2495-2500 (1994).
12. Hori, Y., Wakebe, H., Tsukamoto, T. & Koga, O. Adsorption of CO accompanied with simultaneous charge transfer on copper single crystal electrodes related with electrochemical reduction of CO2 to hydrocarbons. *Surf. Sci.* 335, 258-263 (1995).
13. Hori, Y., Murata, A. & Yoshinami, Y. Adsorption of CO, intermediately formed in Electrochemical Reduction of CO2, at a Copper Electrode. *J. Chem. Soc. Faraday Trans.* 1 87, 125-128 (1991).
14. Hori, Y., Murata, A., Takahashi, R. & Suzuki, S. Electrochemical Reduction of Carbon Monoxide to Hydrocarbons at Various Metal Electrodes in Aqueous Solution. *Chem. Lett.* 8, 1665-1668 (1987).
15. Hori, Y., Murata, A., Takahashi, R. & Suzuki, S. Electroreduction of CO to CH4 and C2H4 at a Copper Electrode in Aqueous Solutions at Ambient Temperature and Pressure. *J. Am. Chem. Soc.* 109, 5022-5023 (1987).
16. Cook, R. L., Macduff, R. C. & Sammells, A. F. Evidence for Formaldehyde, Formic Acid, and Acetaldehyde as Possible Intermediates during Electrochemical Carbon Dioxide Reduction at Copper. *J. Electrochem. Soc.* 136, 1982-1984 (1989).
17. Dewulf, D. W., Tuo, J. & Bard, A. J. Electrochemical and Surface Studies of Carbon Dioxide Reduction to Methane and Ethylene at Copper Electrodes in Aqueous Solutions. *J. Electrochem. Soc.* 136, 1686-1691 (1989).
18. Kyriacou, G. & Anagnostopoulos, A. Electroreduction of CO2 on differently prepared copper electrodes: The influence of electrode treatment on the current efficiencies. *J. Electroanal. Chem.* 322, 233-246 (1992).

19. Schouten, K. J. P., Kwon, Y., van der Ham, C. J. M., Qin, Z. & Koper, M. T. M. A new mechanism for the selectivity to C1 and C2 species in the electrochemical reduction of carbon dioxide on copper electrodes. *Chem. Sci.* 2, 1902-1909 (2011).
20. Hori, Y., Murata, A. & Takahashi, R. Formation of Hydrocarbons in the Electrochemical Reduction of Carbon Dioxide at a Copper Electrode in Aqueous Solution. *J. Chem. Soc. Faraday Trans.* 1 85, 2309-2326 (1989).
21. Gattrell, M., Gupta, N. & Co, a. A review of the aqueous electrochemical reduction of CO2 to hydrocarbons at copper. *J. Electroanal. Chem.* 594, 1-19 (2006).
22. Hori, Y. et al. "Deactivation of copper electrode" in electrochemical reduction of CO2. *Electrochim. Acta* 50, 5354-5369 (2005).
23. Wolter, O. & Heitbaum, J. Differential Electrochemical Mass Spectroscopy (DEMS)-. *Berichte der Bunsengesellschaft für Phys. Chemie* 6, 2-6 (1984).
24. Baltruschat, H. Differential electrochemical mass spectrometry. *J. Am. Soc. Mass Spectrom.* 15, 1693-706 (2004).
25. Hartung, T. & Baltruschat, H. Differential Electrochemical Mass Spectrometry Using Smooth Electrodes: Adsorption and H/D-Exchange Reactions of Benzene on Pt. *Langmuir* 6, 953-957 (1990).
26. Ashton, S. J. Design, Construction and Research Application of a Differential Electrochemical Mass Spectrometer (DEMS). 8, (Springer Berlin Heidelberg, 2012).
27. Jusys, Z., Massong, H. & Baltruschat, H. A New Approach for Simultaneous DEMS and EQCM: Electro-oxidation of Adsorbed CO on Pt and Pt—Ru. *J. Electrochem. Soc.* 146, 1093-1098 (1999).
28. Wonders, A. H., Housmans, T. H. M., Rosca, V. & Koper, M. T. M. On-line mass spectrometry system for measurements at single-crystal electrodes in hanging meniscus configuration. *J. Appl. Electrochem.* 36, 1215-1221 (2006).

It is to be understood that, while the invention has been described in conjunction with the preferred specific embodiments thereof, the foregoing description is intended to illustrate and not limit the scope of the invention. Other aspects, advantages, and modifications within the scope of the invention will be apparent to those skilled in the art to which the invention pertains.

All patents, patent applications, and publications mentioned herein are hereby incorporated by reference in their entireties.

The invention having been described, the following examples are offered to illustrate the subject invention by way of illustration, not by way of limitation.

EXAMPLE 1

DEMS Cell Design and Construction

Figure 2:
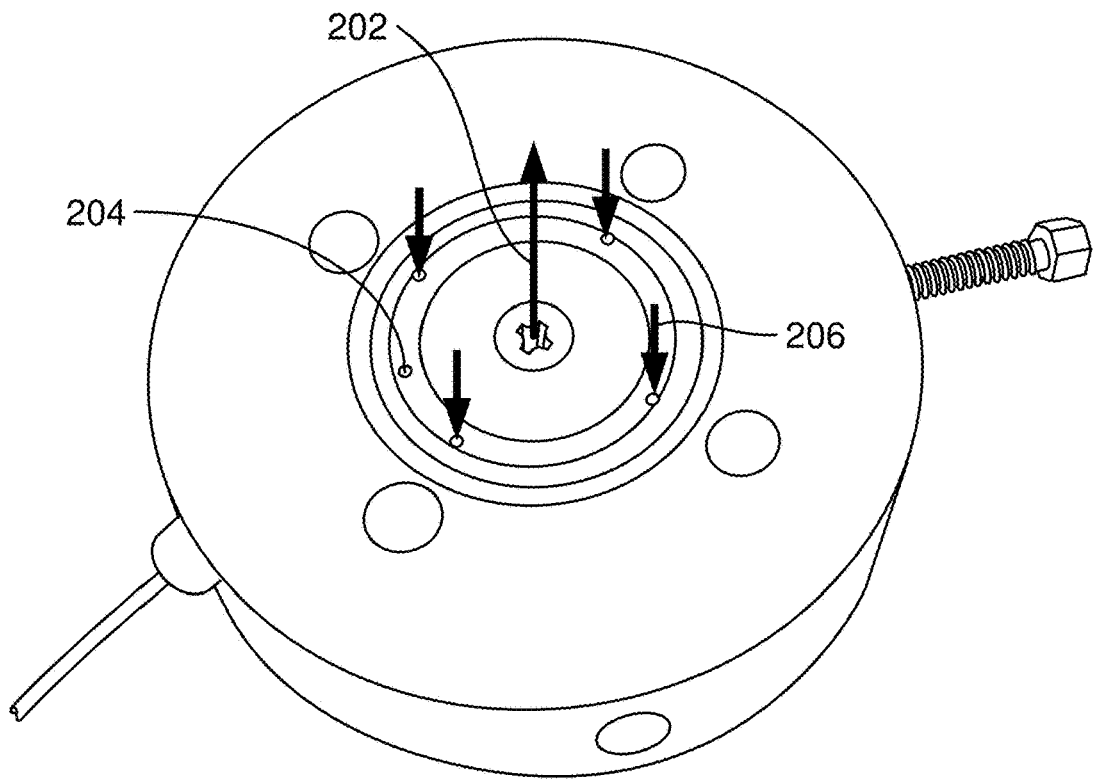
FIG. 2 shows an embodiment of a working electrode chamber with electrolyte inlets and outlets labeled. 202: Electrolyte In. 204: Reference Electrode Port. 206: Electrolyte Out.

A schematic of a novel DEMS cell is depicted in FIGS. 1A to 1D. The main feature differentiating it from previous designs is that the electrolyte enters the WE chamber through the center of a washer-shaped electrode, which has an exposed surface area of 1 $cm^2$. The electrolyte rapidly reaches the ion-conducting membrane, which is separated from the WE surface by a thin layer of electrolyte approximately 100 µm thick. The electrolyte then flows laterally outwards towards the four transfer capillaries. The unique electrode design enables the total volume of the WE chamber to be less than 20 µL. The reference electrode is introduced through a capillary port and is positioned roughly 1 mm from the surface of the WE. The geometry of the WE chamber is shown in FIG. 2. A third chamber housing the CE is located above the WE chamber, ensuring a parallel electrode configuration. This parallel electrode geometry is only possible due to the unique washer-shaped WE employed in this design. The CE is a mesh disc with an exposed surface area of roughly 2 $cm^2$. The surface area of the ion-conducting membrane separating the two electrodes is roughly 1.75 $cm^2$, resulting in a low cell impedance and robust electrode connectivity.

The DEMS cell was fabricated out of polycarbonate and fitted with nitrile rubber O-rings. The WE was machined from a copper rod (99.999%). Prior to each experiment the WE surface was mechanically polished with a diamond polishing compound to a mirror-like finish (0.1 µm, Ted Pella Inc.). The counter electrode was a Pt gauze disc (100 mesh, 99.9% Sigma Aldrich) that was thermally annealed prior to each experiment. An Ag/AgCl electrode was used as the reference (1 mm OD, Innovative Instruments Inc.). A proton-conducting membrane (Nafion 110, Ion Power Inc.) was used to separate the WE and CE chambers. A PTFE sheet (20 nm pore size, Hangzhou Cobetter Filtration Equipment Co.) was used as the pervaporation membrane. The electrolyte was drawn from a sparging tank where $CO_2$ (5.0 Paxair) was bubbled through a 0.1 M $KHCO_3$ (99.7% Sigma Aldrich) solution prepared using 18.2 MΩ deionized water from a Millipore system. The steady state pH of the electrolyte was 6.8.

Electrolyte Flow Rate

Figure 6:
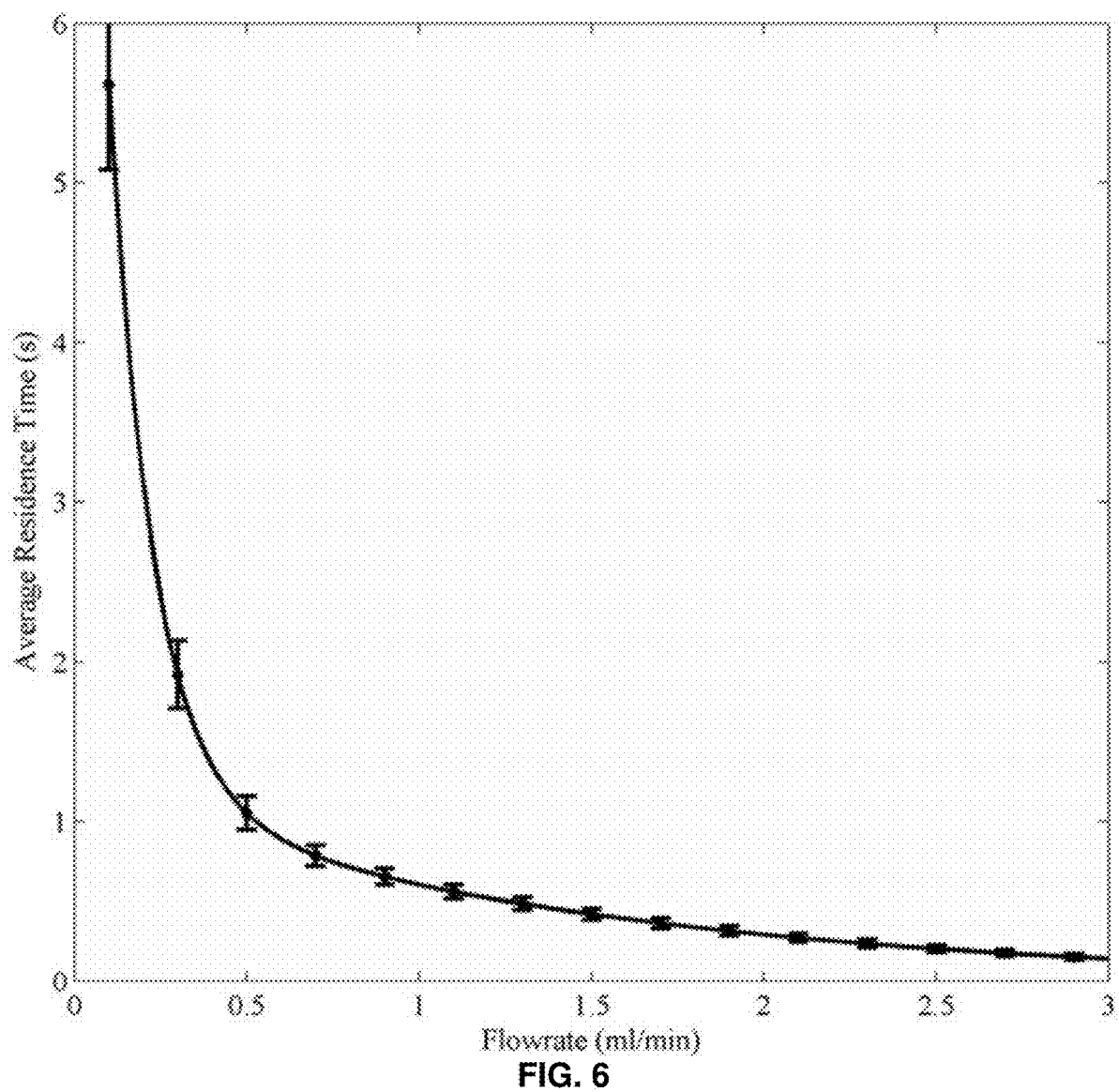
FIG. 6 shows the residence time distribution in the WE chamber.
Figure 7A:
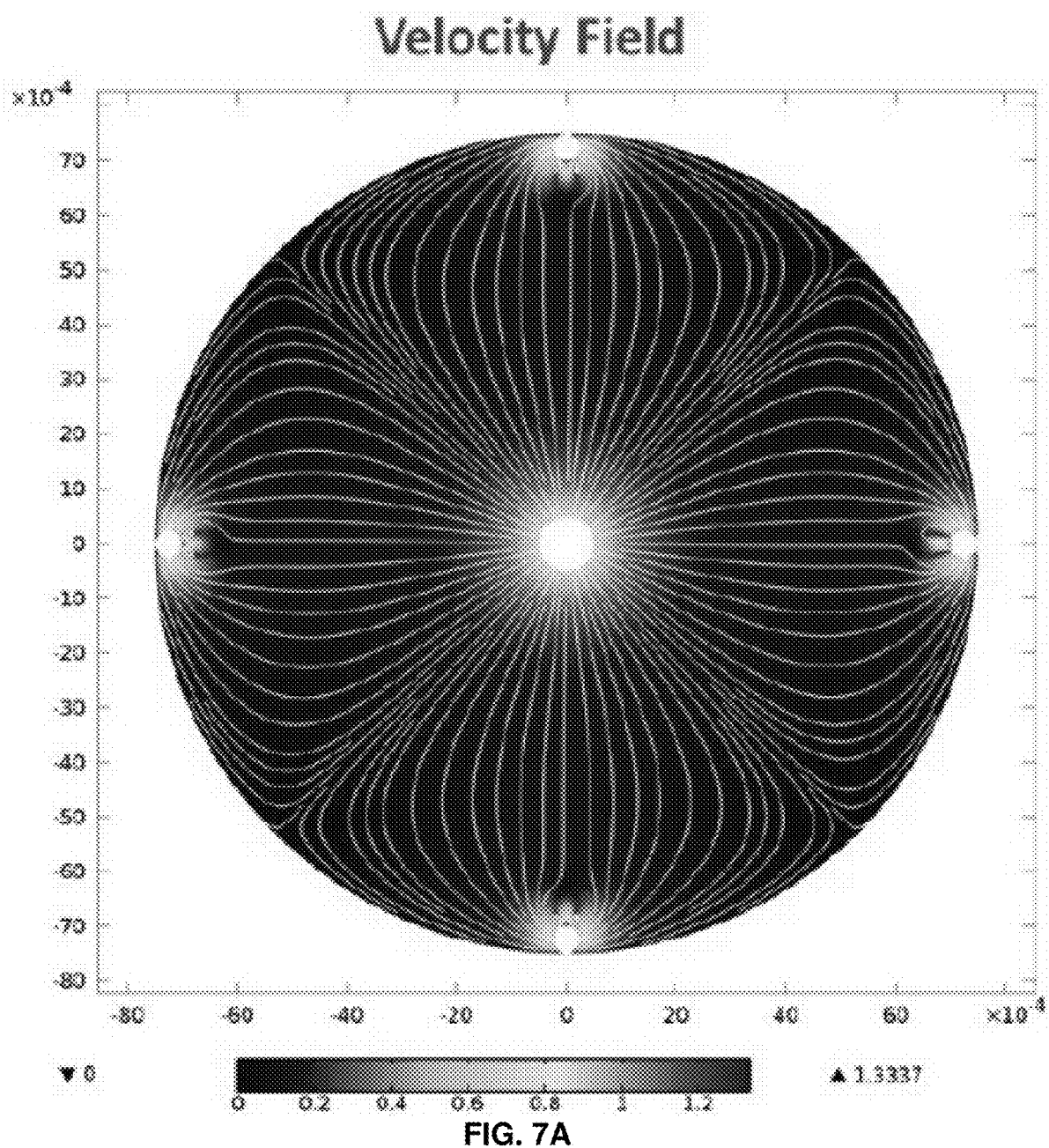
FIG. 7A shows the calculated velocity field across the WE Surface at 1 mL/min.
Figure 7B:
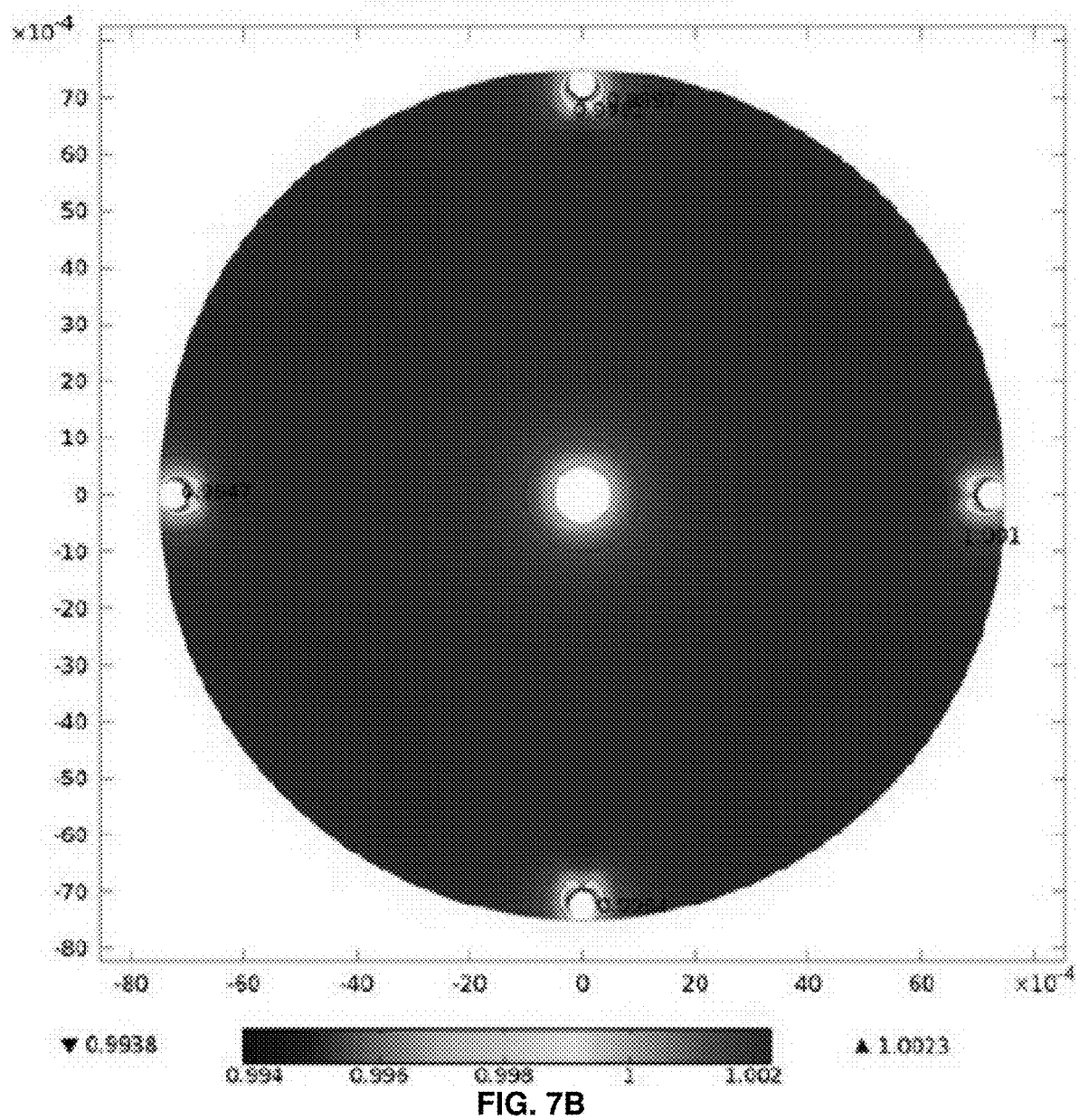
FIG. 7B shows the calculated pressure field across the WE Surface at 1 mL/min.

Since the potential applied to the working electrode will be scanned at 1 mV/s the transit time from the working electrode chamber to the collection chamber should be less than 1 s. In order to determine the optimal electrolyte flow rate the residence time distribution of the electrolyte in the WE chamber and the four transfer capillaries was calculated as a function of flow rate by solving the Navier-Stokes equation in ComSol Multiphysics. The results of this calculation are shown in FIG. 6, which indicate that an electrolyte flow rate of at least 0.5 mL/min is required to achieve the desired transit time. However, the standard deviation of the residence time distribution is rather large at this flow rate, as indicated by the error bars. Therefore, in order to minimize the uncertainty in electrolyte residence time and to avoid mixing, an electrolyte flow rate of 1 mL/min was selected. Assuming no dilution of the gaseous products occurs as a worst case, the volumetric generation rate of gaseous products was calculated to be less than 100 µL/min at −1.2 V vs RHE. Thus, there should be no issues with gas accumulation inside the chambers of the cell at the selected flow rate. The theoretical model of the WE chamber was then used to calculate the velocity and pressure fields across the surface of the WE at 1 mL/min. The result of this calculation can be seen in FIGS. 7A and 7B, which demonstrates that the velocity and pressure fields are uniform across the surface of the WE. Thus, this cell design is optimal due to uniform conditions of potential, pressure, and electrolyte velocity across the surface of the WE.

Electrochemistry

Electrochemistry was conducted using a Biologic VSP-300 potentiostat. All electrochemical data was recorded versus a Ag/AgCl reference electrode and then converted to the RHE. Prior to each experiment the potential applied to the working electrode was swept from open circuit to −1 V versus RHE at 50 mV/s in order to reduce the native $CuO_x$ layer. Potentiostatic electrochemical impedance spectroscopy (PEIS) was then used to determine the uncompensated solution resistance ($R_u$) by applying frequencies from 1 MHz to 10 Hz at the open circuit potential and fitting the resulting Nyquist plot to an RRQRQ equivalent circuit. The potentiostat compensated for 95% of the value of $R_u$ and the last 5% was post-corrected to arrive at accurate potentials. The potential applied to the working electrode was then scanned from 0 to −1.2 V vs RHE at 1 mV/s. This linear potential sweep was repeated consecutively two times, with the second scan being used for further analysis.

Product Detection by Mass Spectrometry

Figure 8:
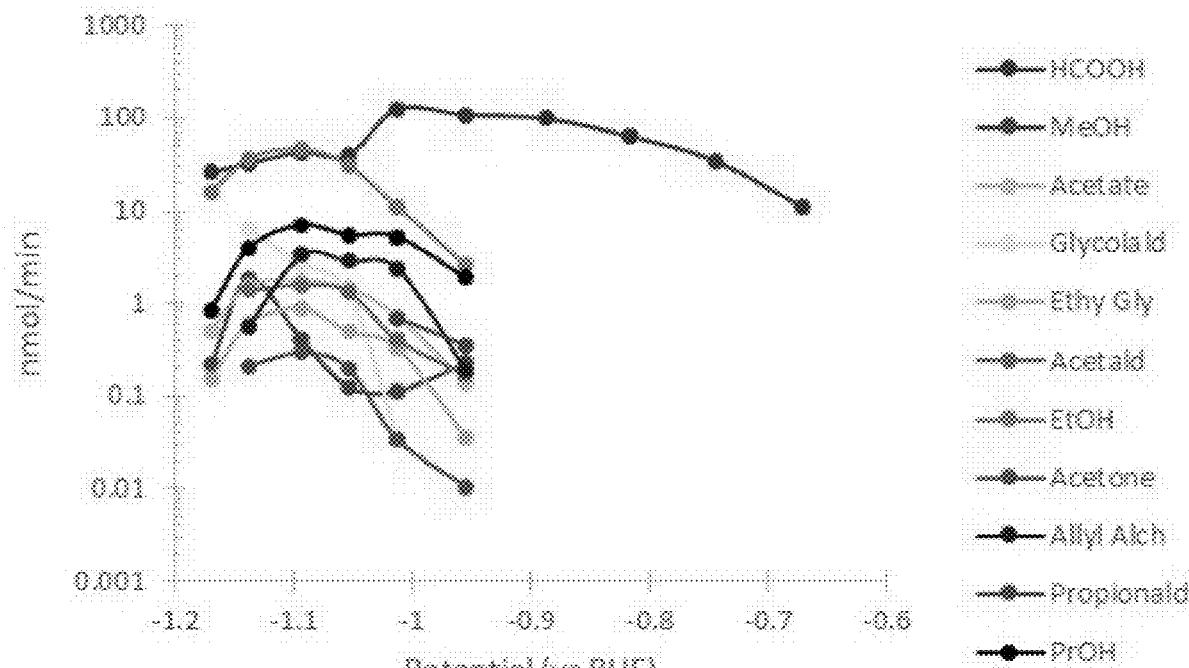
FIG. 8 shows the liquid product generation rates as a function of potential on polycrystalline copper.

All gaseous $CO_2RR$ products produced on metallic copper will be detectable with this setup except CO. This limitation is due to the fact that CO ionization produces mass fragments identical to those produced by the ionization of $CO_2$. In order to determine the liquid product detection limit sequentially diluted ethanol standards of decreasing concentrations were flowed through the cell at 1 mL/min. By this means the liquid product detection limit was determined to be roughly 10 µM. In order to meet these detection limits at an electrolyte flow rate of 1 mL/min a given liquid product must be generated at a rate of at least 10 nmol/min. As shown in FIG. 8, the only liquid products which meet this requirement are formic acid and ethanol. However, the volatility of formic acid is similar to that of water and, hence, will not pervaporate into the ionization chamber. The proposed explanation for not being able to detect formic acid was confirmed by attempting to detect mass fragments produced upon formic acid ionization (m/z=29, 45, and 46) upon passage of a 10 mM HCOOH solution through the cell. No signals were observed at the anticipated m/z ratios. At ethanol concentrations expected during $CO_2RR$ only the primary mass fragment at m/z=31 was observable. This is an issue because this is the primary fragment produced by the ionization of several other $CO_2RR$ products including: methanol, glycolaldehyde, ethylene glycol, allyl alcohol, and 1-propanol. While ethanol is expected to account for between 50-90% of the m/z=31 signal it cannot be attributed to the formation of ethanol alone. Thus, the signal of m/z=31 will be attributed to the formation of alcohols.

Mass spectra were acquired using a Hiden HPR40 dissolved-species mass spectrometer. An electron energy of 70 eV was used for the ionization of all species at an emission current of 500 µA. Hydrogen ions (m/z=2) were accelerated using a voltage of 1.3 V to prevent detector saturation while methane (m/z=15), ethene (m/z=26), and the alcohols (m/z=31) were accelerated using a voltage of 3 V in order to maximize signal. These mass-selected product cations were detected using an electron multiplier with a detector voltage of 1200 V and were selected due to their abundance, minimal overlap with other products, and low background signals.

Electrochemical Impedance Spectroscopy

Figure 9:
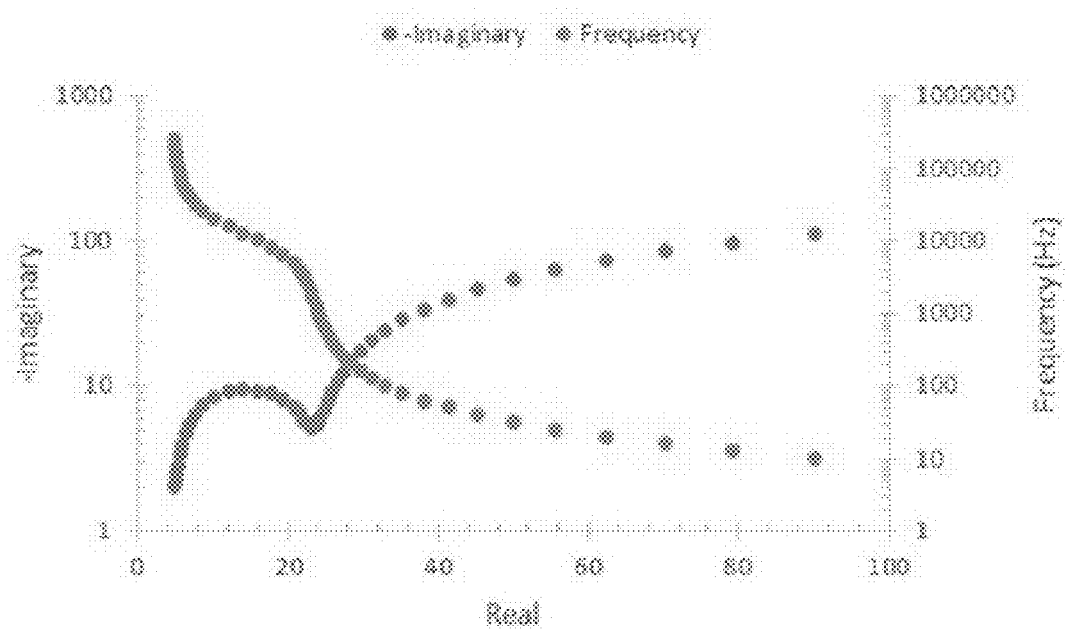
FIG. 9 shows a Nyquist plot obtained at open circuit potential.
Figure 10:
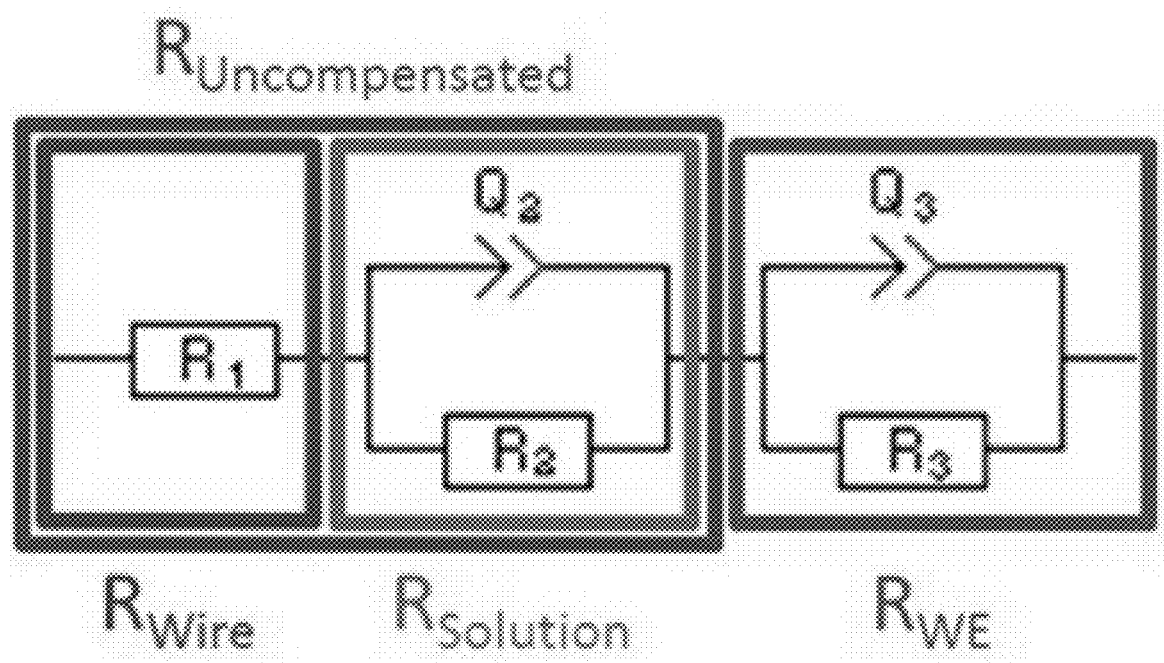
FIG. 10 shows the RRQRQ equivalent circuit of the DEMS cell.
Figure 11:
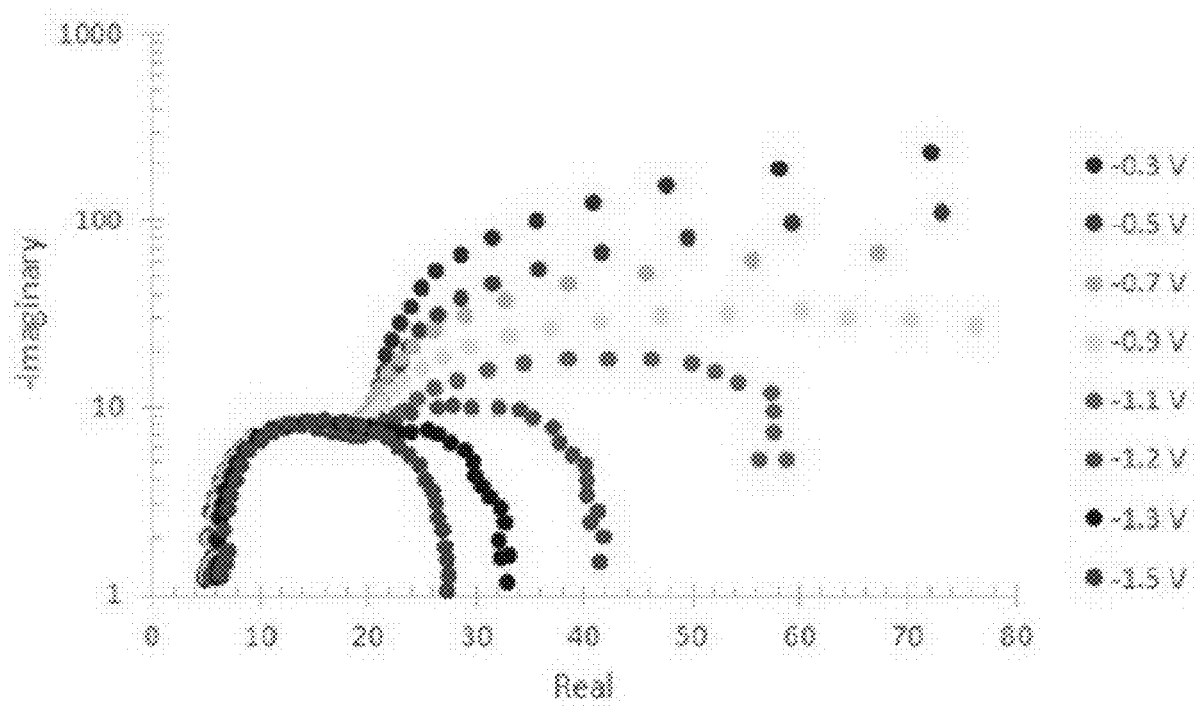
FIG. 11 shows the Nyquist plot as a function of applied potential.

Potentiostats do not automatically adjust for the resistance between the working and reference electrode, which is also known as the uncompensated resistance ($R_u$). $R_u$ results in a voltage drop that can seriously compromise the accuracy of the WE potential measurement, especially when high currents are drawn. The electrolyte separating the working and reference electrodes is the primary source of this uncompensated resistance. In order to experimentally determine the value of $R_u$ PEIS was conducted. The resulting Nyquist plot is depicted in FIG. 9 and can be fitted to an RRQRQ equivalent circuit, as depicted in FIG. 10. Since the Nyquist plot depicts impedances due to the WE kinetics as well as $R_u$ it is important to identify which aspects of the Nyquist plot correspond to the different impedances of the system. In order to prove that the higher frequency arc is due to the working electrode kinetics PEIS was conducted at increasingly negative potentials. As shown in FIG. 11, the width of the high frequency arc decreases when increasingly negative potentials are applied, indicating that this arc is due to the impedance associated with the working electrode.

Differential Electrochemical Mass Spectrometry

Figure 3A:
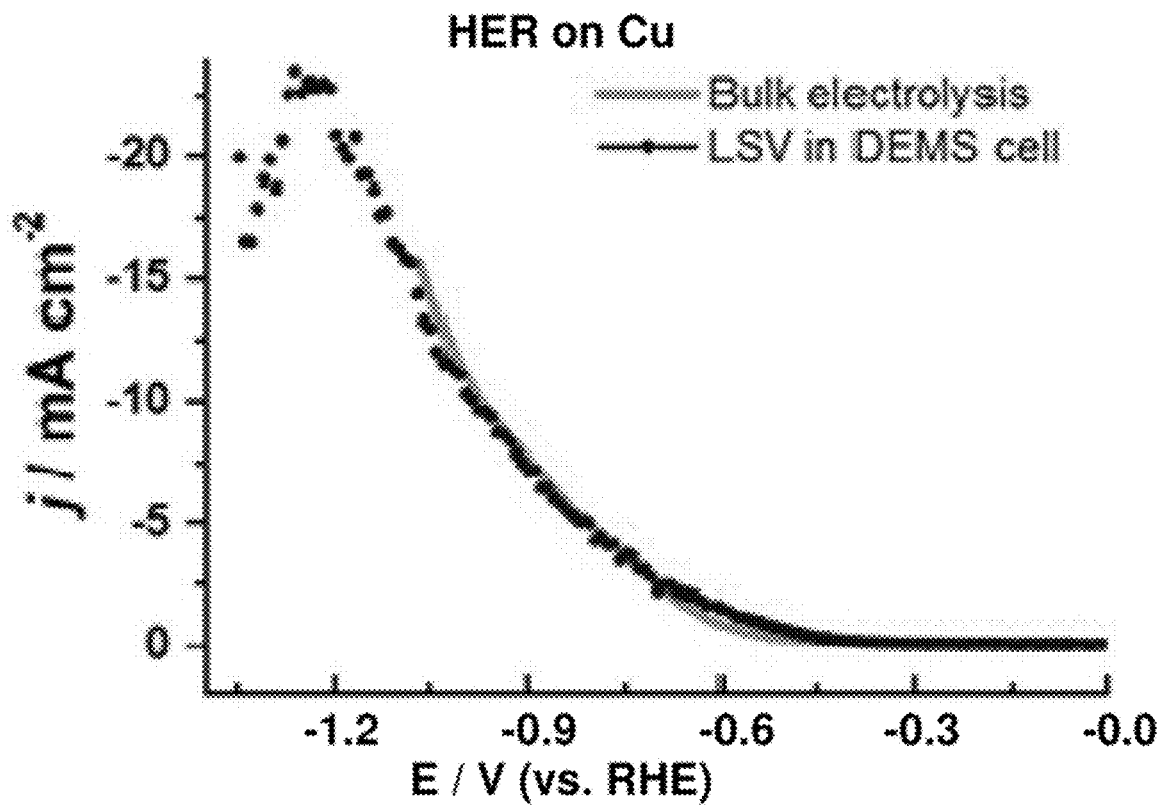
FIG. 3A shows a set of data obtained with the proposed DEMS cell in both $N_2$ and $CO_2$ sparged electrolytes showing current density and m/z=2 mass ion current record vs potential in $N_2$ sparged 0.1 M $KHCO_3$.
Figure 3B:
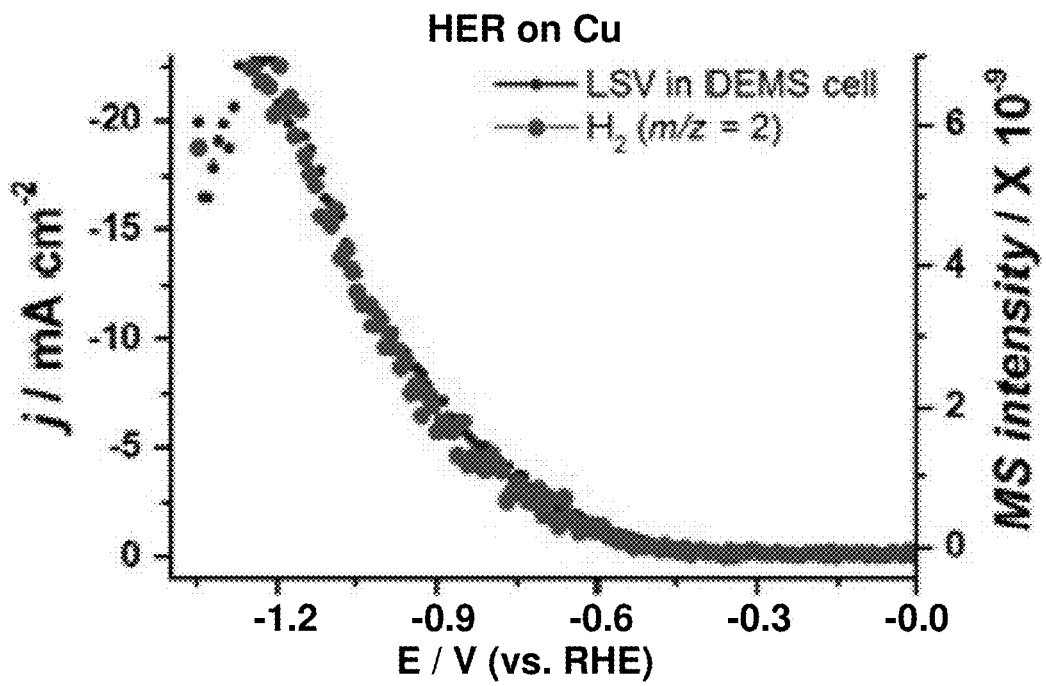
FIG. 3B shows a set of data obtained with the proposed DEMS cell in both $N_2$ and $CO_2$ sparged electrolytes showing current density and m/z=2 mass ion current record vs potential in $N_2$ sparged 0.1 M $KHCO_3$.
Figure 3C:
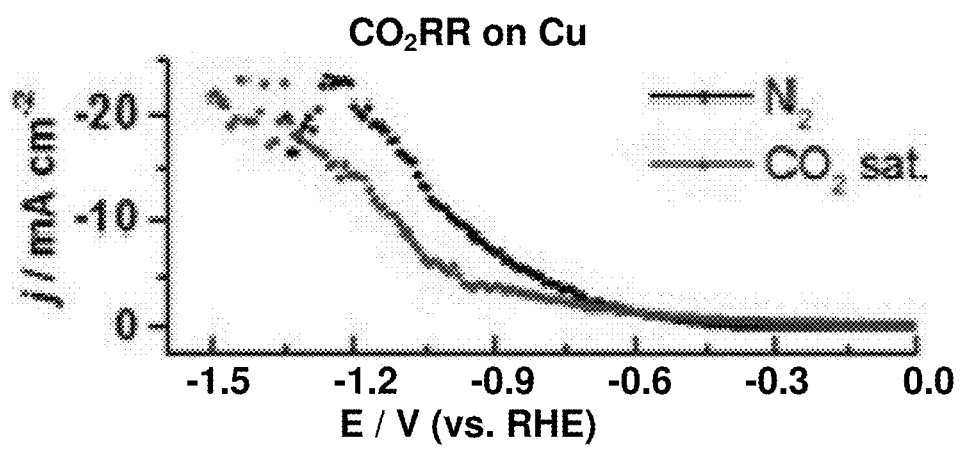
FIG. 3C shows data obtained with the proposed DEMS cell in both $N_2$ and $CO_2$ sparged electrolytes showing current density and m/z mass ion currents corresponding to reaction products of interest obtained in $CO_2$ sparged 0.1 M $KHCO_3$.
Figure 3D:
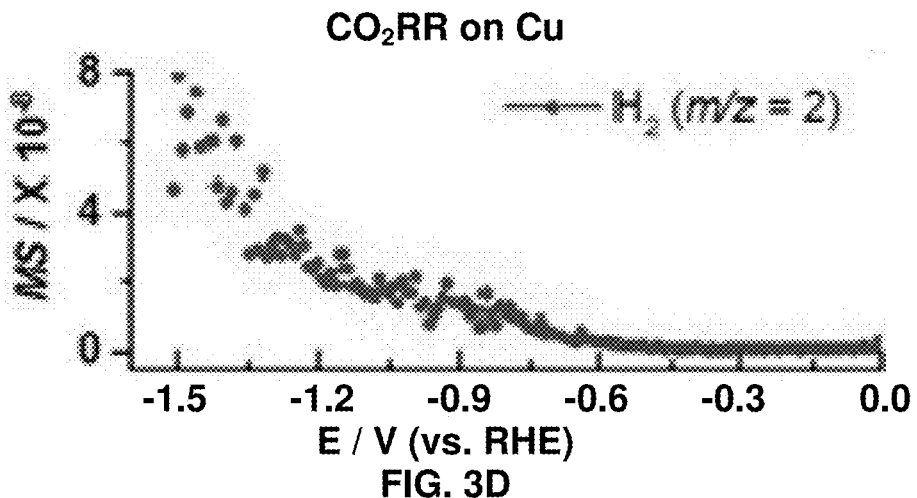
FIG. 3D shows data obtained with the proposed DEMS cell in both $N_2$ and $CO_2$ sparged electrolytes showing current density and m/z mass ion currents corresponding to reaction products of interest obtained in $CO_2$ sparged 0.1 M $KHCO_3$.
Figure 3E:
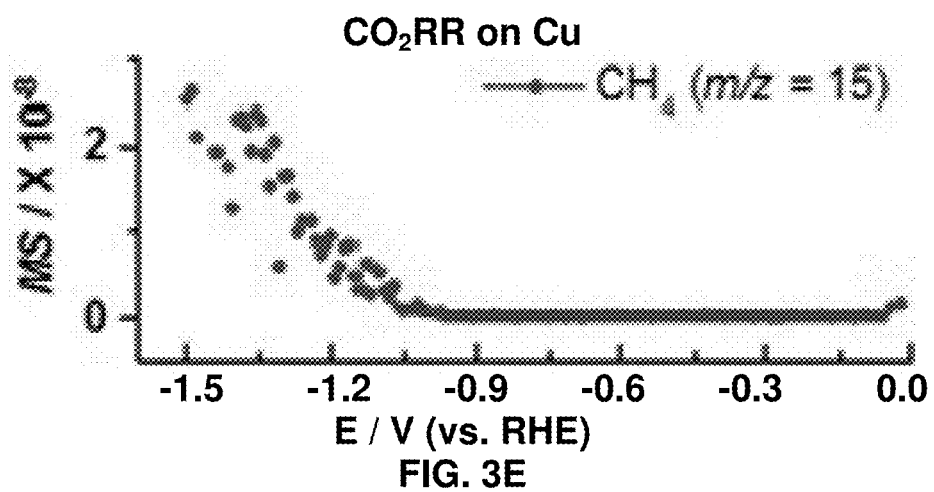
FIG. 3E shows data obtained with the proposed DEMS cell in both $N_2$ and $CO_2$ sparged electrolytes showing current density and m/z mass ion currents corresponding to reaction products of interest obtained in $CO_2$ sparged 0.1 M $KHCO_3$.
Figure 3F:
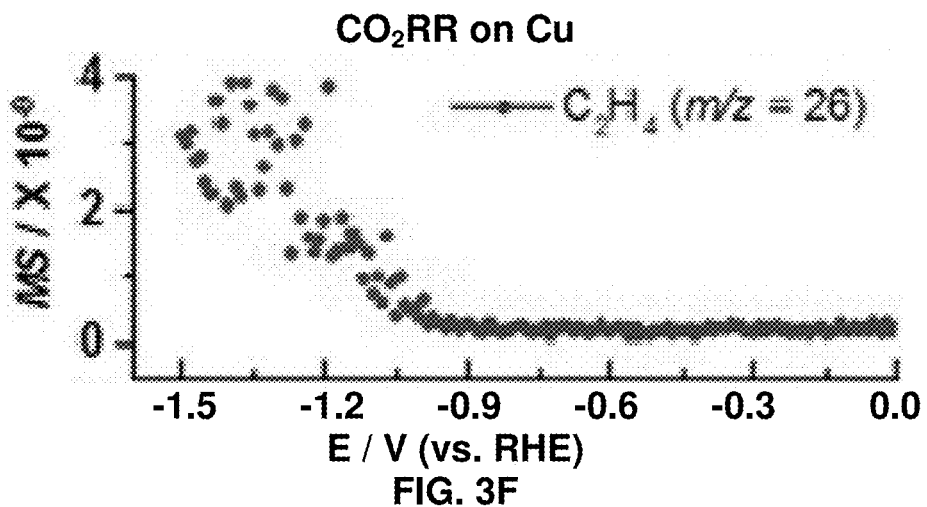
FIG. 3F shows data obtained with the proposed DEMS cell in both $N_2$ and $CO_2$ sparged electrolytes showing current density and m/z mass ion currents corresponding to reaction products of interest obtained in $CO_2$ sparged 0.1 M $KHCO_3$.
Figure 3G:
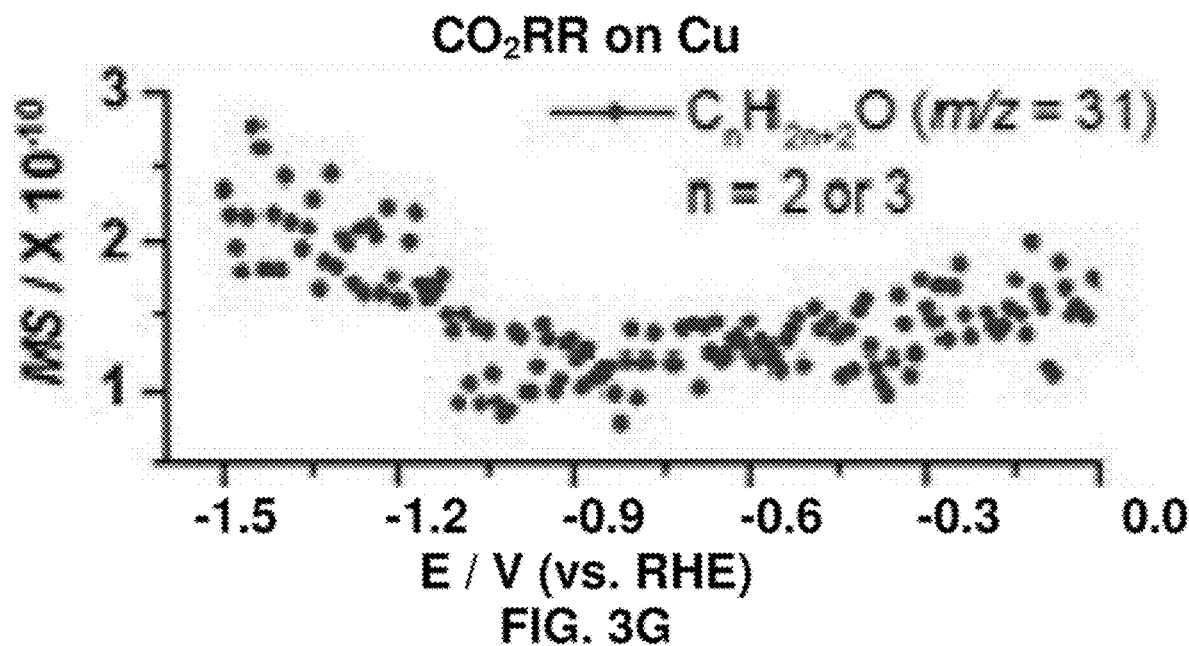
FIG. 3G shows data obtained with the proposed DEMS cell in both $N_2$ and $CO_2$ sparged electrolytes showing current density and m/z mass ion currents corresponding to reaction products of interest obtained in $CO_2$ sparged 0.1 M $KHCO_3$.

FIGS. 3A and 3B depict the linear sweep voltammogram and corresponding mass spectrometer ion current for m/z=2 obtained in a $N_2$ atmosphere. Since the hydrogen evolution reaction (HER) is the only cathodic reaction that occurs under these conditions the results enable the m/z=2 mass ion current to be correlated to the partial current of HER. These results prove that the system is capable of quantitative measurement, since the current density and m/z=2 mass ion current are perfectly correlated at any given potential.

FIG. 3C to 3G depicts the linear sweep voltammogram and mass spectrometer ion currents for the detectable products of $CO_2RR$ obtained in a $CO_2$ atmosphere (steady state pH 6.8) using a polycrystalline copper electrode. The voltammogram matches well with those reported in the literature, indicating that the cell geometry does not significantly impact the electrochemistry. As depicted in FIG. 3C to 3G, the trends observed for the mass ion currents correlate well with the partial current trends reported in the literature. In the future the mass ion currents for the different reaction products obtained on polycrystalline copper will be calibrated so that the partial current potential dependence of the different reaction products obtained using the DEMS cell can be compared to those reported in the literature.

Resolving an Increasing $R_u$ of DEMS Cell

Figure 12:
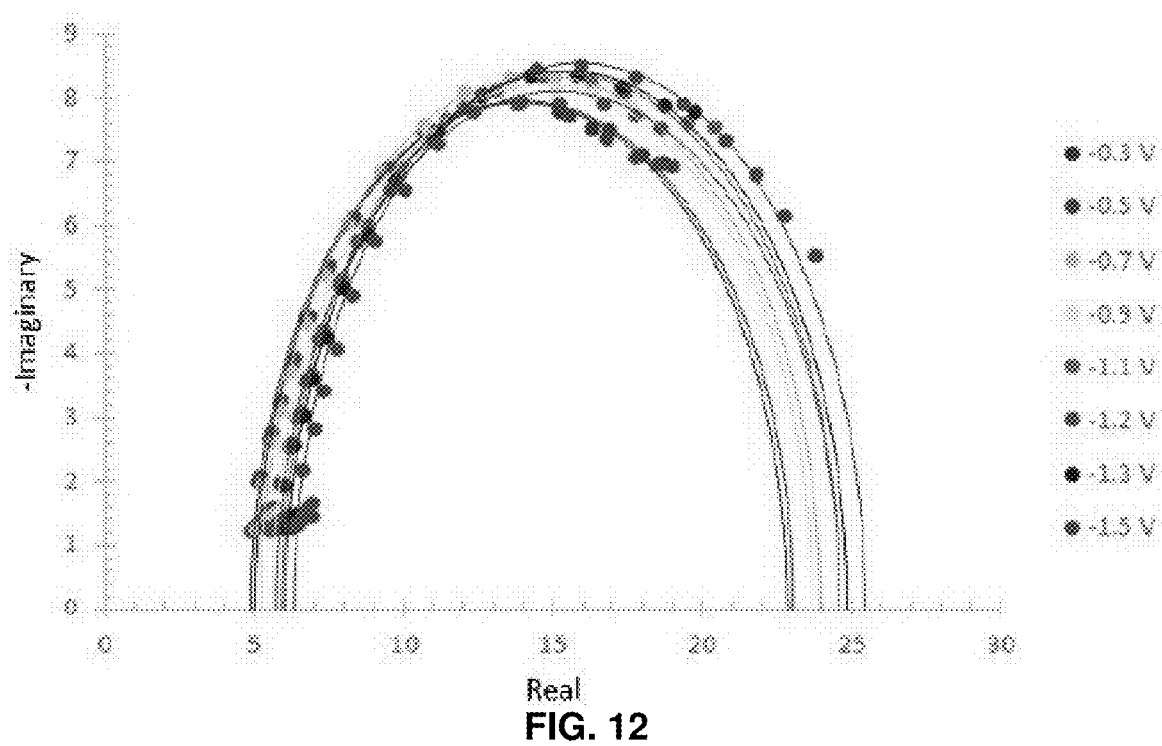
FIG. 12 shows $R_u$ increasing as a function of potential.

As shown in FIG. 12 the value of $R_u$ increases as more negative potentials are applied to the WE. This phenomenon is a result of bubble formation, which creates a more tortuous and resistive path for ion conduction in the vicinity of the RE. Locating the RE at the edge of the WE is the source of this problem, since all of the bubbles generated at the WE surface are swept radially outwards toward the four transfer capillaries and the RE, making $R_u$ unstable. This is an issue because as more negative potentials are applied both the current and the value of $R_u$ increase, resulting in greater errors in the WE potential measurement. Solving this issue is not trivial. The amount of $R_u$ compensation cannot simply be increased as a function of potential because doing so could result in momentary overcompensation in the event that the bubbles are suddenly cleared. This would result in WE potential instability. We propose to modify the existing DEMS cell to enable potential referencing to be done at the center of the WE. This location is optimal because any bubbles produced will be swept away from the point of potential referencing instead of directly toward it. Thus, we expect that the value of $R_u$ will be independent of potential when this new electrode configuration is employed.

EXAMPLE 2

A Novel Differential Electrochemical Mass Spectrometer Cell Design for Online Quantification of the Products Produced During Electrochemical Reduction of $CO_2$ The discovery of electrocatalysts that can efficiently reduce $CO_2$ to fuels with high selectivity is a subject of contemporary interest. Currently, the available analytical methods for characterizing the products of $CO_2$ reduction require tens of hours to obtain the dependence of the product distribution on the applied potential. As a consequence, there is a need to develop novel analytical approaches that can reduce this analysis time down to about an hour. We report here the design, construction, and operation of a novel differential electrochemical mass spectrometer (DEMS) cell geometry that enables the partial current densities of volatile electrochemical reaction products to be quantified in real time. The capabilities of the novel DEMS cell design are demonstrated by carrying out the electrochemical reduction of $CO_2$ over polycrystalline copper. The reaction products are quantified in real time as a function of the applied potential during linear sweep voltammetry, enabling the product spectrum produced by a given electrocatalyst to be determined as a function of the applied potential on the timescale of roughly one hour.

Introduction

The prospect of utilizing solar energy to promote the electrochemical or photoelectrochemical reduction of $CO_2$ to transportation fuels has motivated extensive research aimed at identifying highly active and selective electrocatalysts for $CO_2$ reduction ($CO_2R$).[1-4] These efforts have revealed that copper is the only metallic electrocatalyst capable of reducing $CO_2$ to hydrocarbons and alcohols.[5-7] Unfortunately, the reaction requires an overpotential of approximately −1 V or more, resulting in a cathodic $CO_2R$ energy efficiency of less than 25% (See SI-1).[8-11] It has also been observed that metallic copper produces up to 16 different products depending on the surface morphology and the applied potential.[10,11] As a consequence, a great deal of attention is being devoted to the discovery of novel electrocatalysts that can reduce $CO_2$ to fuels with higher efficiency and a more narrowly defined product spectrum than can be achieved with metallic copper.

A combination of analytical techniques must be employed to fully characterize the products of $CO_2R$ because the reaction produces both gaseous and liquid-phase products.[8,10] Gas chromatography has been used to quantify the gaseous products by periodically sampling the headspace of the electrochemical cell over the course of electrolysis. The liquid-phase products are analyzed after electrolysis using either high performance liquid chromatography (HPLC) or nuclear magnetic resonance (NMR).[8,10] While gas chromatography is sufficiently sensitive to quantify gaseous products from the effluent of an electrochemical cell, constant potential electrolysis must be performed for roughly one hour in order to reach the detection limits of HPLC or NMR because the Faradaic efficiencies of most liquid-phase products are less than 1%.[10] Due to the reliance on chromatography for product analysis, the dependence of the activity and selectivity of $CO_2R$ electrocatalysts has not been studied extensively as a function of time. This is an issue because $CO_2R$ has been reported to be highly sensitive to electrocatalyst deactivation.[12-18] Therefore, there is considerable interest in the development of an analytical technique capable of continuously quantifying the generation rates of the major reaction products in both phases in real time. The availability of such a technique would enable the potential dependence of the major reaction products to be determined rapidly by simply sweeping the applied potential and recording the product generation rates in real time. With this objective in mind, Koper et al. have developed a micron-sized sampling tip that can be placed close to an electrode surface in order to periodically collect liquid-phase reaction for ex-situ analysis using HPLC.[19] While this technique is well suited for detecting the presence of liquid-phase reaction products with a more rapid sampling rate, it cannot be used to quantify the Faradaic efficiencies of these products due to the low collection efficiency of the product.

Differential electrochemical mass spectrometry (DEMS) is an analytical technique that utilizes pervaporation to continuously separate and collect electrochemical reaction products.[20] Because the analysis time of mass spectrometry is on the order of a second, the generation rates of gaseous or volatile reaction products can be quantified in real time by recording the relevant mass ion currents and relating them to the partial current densities of the corresponding reaction products.[20] Koper et al. developed an online electrochemical mass spectrometer (OLEMS) capable of detecting the hydrocarbon products of $CO_2R$ in real time using a sampling tip placed in close proximity with the electrode surface.[21] In related work, Mayrhofer et al. have recently reported the design of a novel DEMS cell capable of detecting the hydrocarbon products of $CO_2R$ that can also be used to raster an electrode surface with varying composition in order to rapidly screen bimetallic $CO_2R$ electrocatalysts.[22] While both approaches can be used to detect the presence of gaseous electrochemical reaction products in real time, neither approach is capable of quantification due to low and ill-defined product collection efficiencies. The collection efficiency of OLEMS is extremely low and highly sensitive to the distance between the sampling tip and the electrode surface, whereas the thin-layer flow cell geometry employed by Mayrhofer et al. suffers from a low product collection efficiency under electrolyte convection.[23]

The capabilities of DEMS strongly depend on the design of the electrochemical cell, which must be capable of achieving both a rapid response time and a high product collection efficiency[23,24] A number of additional design criteria must also be met to enable product quantification. The working and counter electrodes should be parallel to ensure a uniform potential distribution across the surface of the electrodes, and be separated by an ion-conducting membrane to prevent unwanted parasitic reactions, such as the oxidation of $CO_2R$ products or the reduction of $O_2$. Electrolyte convection must be employed for two reasons: 1) to assure that the electrolyte does not become depleted of $CO_2$ and 2) to provide good mass transfer to and away from the cathode (see SI-2). It is also necessary to isolate the working electrode from the pervaporation membrane because significant $CO_2$ depletion will occur due to pervaporation through the collection membrane if it is in the vicinity of the working electrode. As a result, the electrolyte volume between the working electrode and the pervaporation membrane must be minimized so that an acceptable delay time between product generation and detection can be achieved without diluting the liquid-phase reaction products beyond the limits of detection. Finally, the surface area of the working electrode should be large so that the concentration of the liquid-phase products can be maximized.

DEMS cell designs described in the literature preclude product quantification primarily as a consequence of either poorly defined electrochemistry or low product collection efficiencies.[21,25] The dual thin-layer flow cell is capable of achieving liquid-phase product collection efficiencies as high as 40% by locating the working electrode and pervaporation membrane in separate chambers.[24] By minimizing the overall cell volume delay times of ~2 s were achieved. However, the design suffers from a non-parallel electrode configuration and a high cell resistance (~10 kΩ) due to the capillary tube connecting the working and counter electrode chambers.[23,24] The high cell resistance makes it impossible to drive $CO_2R$ to hydrocarbons and alcohols using polycrystalline copper without first reaching the compliance voltage of modern potentiostats. To the best of the authors knowledge, there have been no reports in the literature of using DEMS to detect the liquid-phase products of $CO_2R$ or to quantify any reaction products in real time.[13,16,22,26-32] The objective of the work reported here was to design and construct a DEMS cell that meets all of the criteria noted above and to demonstrate its performance by conducting $CO_2R$ using a polycrystalline copper cathode.

EXPERIMENTAL

DEMS Cell Design and Construction

Figure 13:
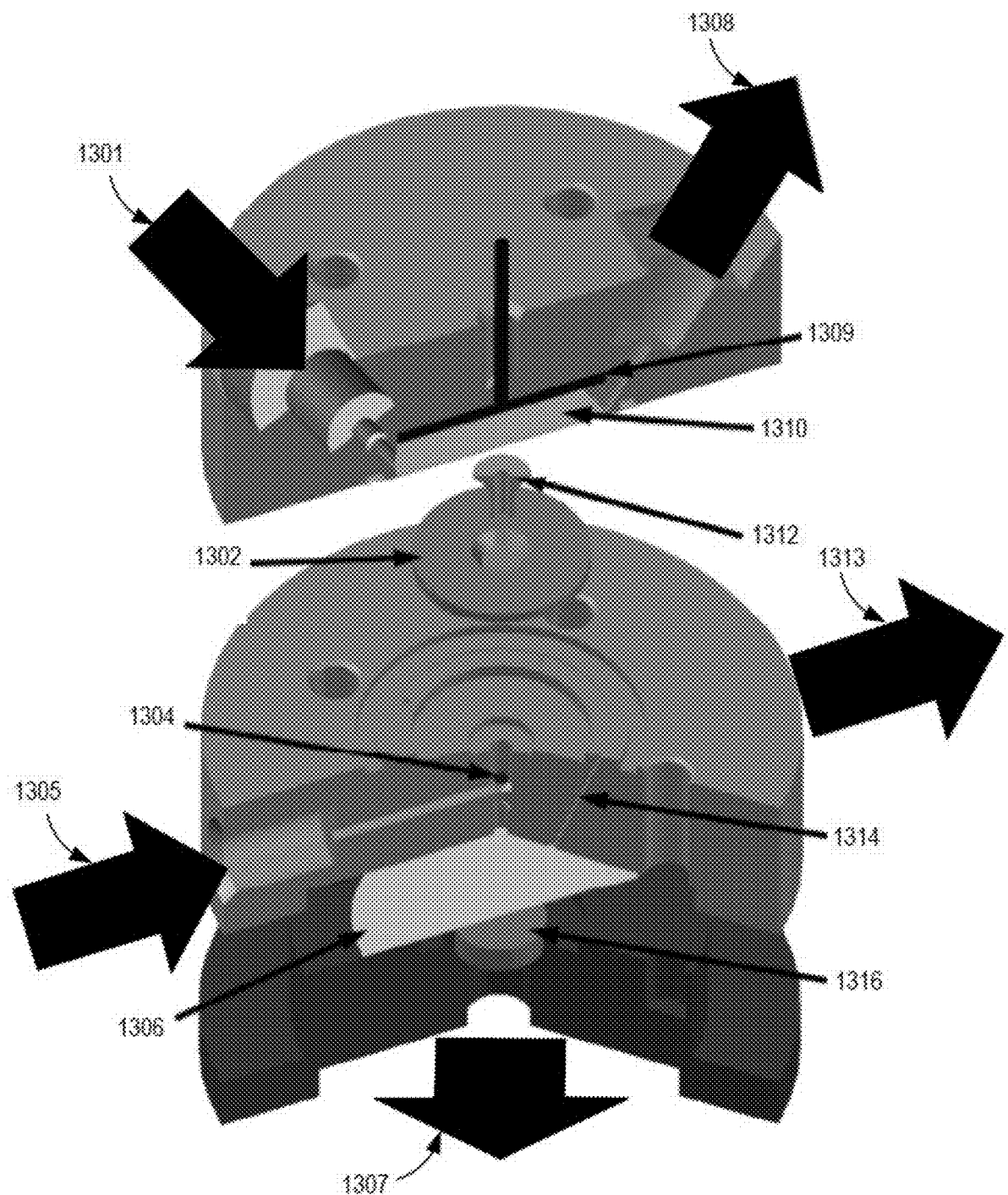
FIG. 13 shows a schematic of an embodiment of the DEMS cell. 1301: Anolyte Inlet. 1302: Washer Working Electrode. 1304: Reference Electrode. 1305: Catholyte Inlet. 1306: Pervaporation Membrane. 1307: To MS. 1308: Anolyte Outlet. 1309: Counter Electrode. 1310: Ion-Conducting Membrane. 1312: Mounting Screw. 1313: Catholyte Outlet. 1314: Transfer Capillary (1 of 4). 1316: Stainless Steel Frit.
Figure 14:
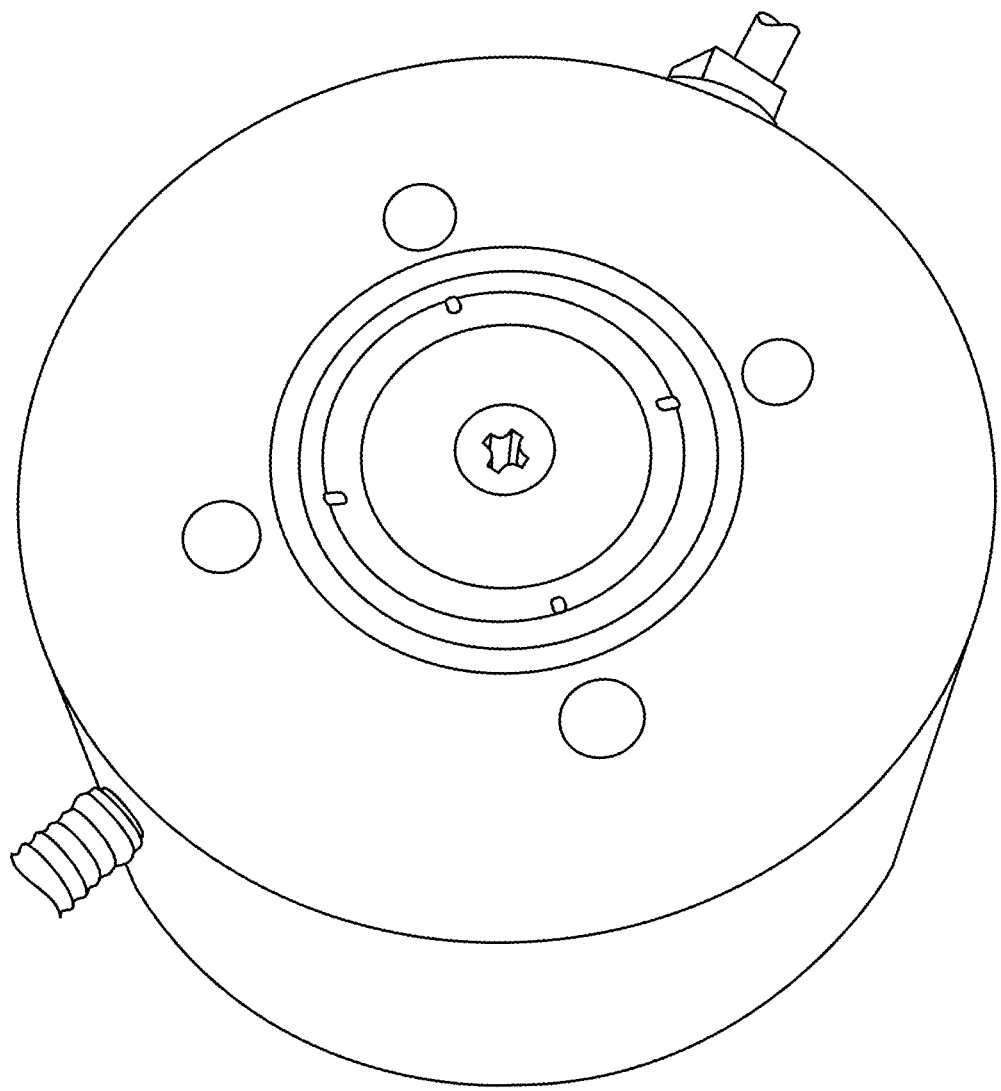
FIG. 14 shows a photograph of a working electrode chamber.

A schematic of the DEMS cell is depicted in FIG. 13. The catholyte enters the working electrode chamber through the center of a washer-shaped electrode with an exposed surface area of 1 $cm^2$. The catholyte rapidly reaches the ion-conducting membrane, which is separated from the working electrode surface by a thin layer of electrolyte approximately 130 μm thick. The catholyte then flows radially outwards towards the four transfer capillaries, which connect the working electrode and collection chambers. FIG. 14 shows the details of the working electrode chamber, which has a total catholyte volume of roughly 25 μL. The reference electrode intercepts the catholyte stream at the base of the working electrode mounting screw, which also serves as the electrolyte inlet to the working electrode chamber. By locating the reference electrode outside of the working electrode chamber the impact of gaseous product bubble formation on the potential referencing of the working electrode is minimized. A third chamber, located above the working electrode chamber, houses the counter electrode such that a parallel electrode configuration is achieved. The counter electrode is a mesh disc with an exposed surface area of roughly 2 $cm^2$. The electrolyte is pumped from a shared reservoir through both electrode chambers at the same flow rate using a set of identical syringe pumps. The surface area of the ion-conducting membrane separating the two electrode chambers is roughly 1.75 $cm^2$. As a result of these design decisions the DEMS cell has a low cell resistance (~50Ω), robust electrode connectivity, and minimal overpotential at the counter electrode, which enables the potentials required to produce hydrocarbons and alcohols over polycrystalline copper to be experimentally accessible. Additional photographs of the DEMS cell and a table of specifications can be found in the supplementary information (see SI-3 and SI-4).

The working and counter electrode chambers were fabricated of polyether ether ketone (Professional Plastics) and polycarbonate (McMaster-Carr), respectively, and were fitted with Viton O-rings (McMaster-Carr). The cell was treated with UV-generated ozone to reduce the wetting angle of the electrolyte on the exposed surfaces of the cell, which reduces the holdup of gaseous product bubbles in the working electrode chamber (see SI-5). The working electrode was machined from a copper sheet (99.999% Sigma Aldrich). Prior to each experiment the copper surface was polished mechanically with a diamond polishing compound to a mirror-like finish (0.1 μm, Ted Pella Inc.). The counter electrode was a platinum gauze disc (100 mesh, 99.9% Sigma Aldrich) that was flame annealed prior to each experiment. A Ag/AgCl electrode was used as the reference (1 mm OD, Innovative Instruments Inc.). A proton-conducting membrane (Nafion 110, Ion Power Inc.) was used as the ion-conducting membrane. Attempts were made to use an anion-conducting membrane (Selemion AMV, AGC Inc.) but they were not successful due to gaseous product bubble holdup on the membrane surface that severely disrupted the electrochemical measurements. A PTFE sheet (20 nm pore size, Hangzhou Cobetter Filtration Equipment Co.) was used as the pervaporation membrane. A 0.05 M $K_2CO_3$ (99.995% Sigma Aldrich) solution prepared using 18.2 MΩ deionized water from a Millipore system was used as the electrolyte. After saturation with $CO_2$ (99.999% Praxair) at 25° C. the steady state pH of the electrolyte was 6.8, making it chemically equivalent to a 0.1 M $KHCO_3$ solution saturated with $CO_2$ at the same temperature (see SI-6).

Electrochemistry

Electrochemistry was performed using a Biologic VSP-300 potentiostat. All electrochemical data were recorded versus the reference electrode and converted to the RHE scale using the relationship $E_{RHE}=E_{Ag/AgCl}+0.197+0.059\times pH_{Bulk}$. A 5 Hz filter was used to eliminate noise from the working electrode potential measurement caused by the flow of electrolyte. Prior to each experiment the potential applied to the working electrode was swept from open circuit to −1 V vs RHE at 50 mV/s in order to reduce the native $CuO_x$ layer. Potentiostatic electrochemical impedance spectroscopy (PEIS) was then used to determine the total uncompensated resistance ($R_u$) by applying frequencies from 10 Hz to 30 kHz at the open circuit potential (see SI-7). The potentiostat compensated for 85% of $R_u$ in-situ and the last 15% was post-corrected to arrive at accurate potentials. The potential applied to the working electrode was then swept from open circuit to −1.2 V vs RHE at 0.2 mV/s. This scan rate was determined experimentally to be optimal for reducing the impact of bubble noise on the recorded mass ion current trends (see SI-8). The linear potential sweep was repeated twice, and only the second scan was used for further analysis.

Product Detection by Mass Spectrometry

Mass spectra were acquired using a Hiden HPR40 dissolved-species mass spectrometer. An electron energy of 70 eV was used for the ionization of all species with an emission current of 500 μA. Hydrogen ions (m/z=2) were accelerated using a voltage of 1.3 V to prevent detector saturation while methane (m/z=15), ethene (m/z=26), and ethanol/1-propanol (m/z=31) ions were accelerated using a voltage of 3 V to maximize the detector response. All mass-selected product cations were detected using a secondary electron multiplier with a detector voltage of 1,200 V. These mass spectrometer settings were determined to be optimal for maximizing the signal to noise ratio of the liquid-phase products while not overloading the detector with $H_2$ (see SI-9). Using these settings a data point was recorded every 1.4 s. The data was averaged over 10 mV increments during linear sweep voltammetry and over 1 min intervals during chronoamperometry in order to minimize the influence of bubble noise on the recorded trends.

Results and Discussion

Electrolyte Flow Rate and $CO_2R$ Product Detectability

Figure 15A:
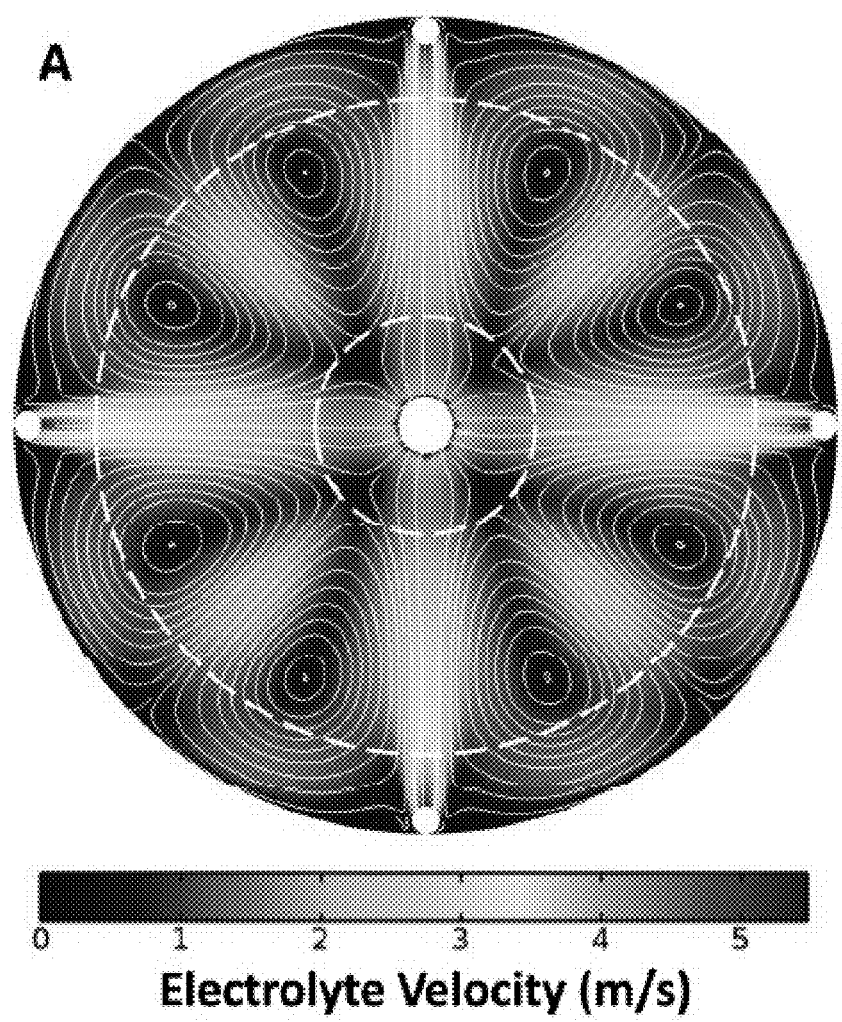
FIG. 15A shows a catholyte flow field in the working electrode chamber at a flow rate of 1 mL/min for convection driven by positive pressure applied at the inlet. The working electrode surface is denoted by the region between the dashed white lines.
Figure 15B:
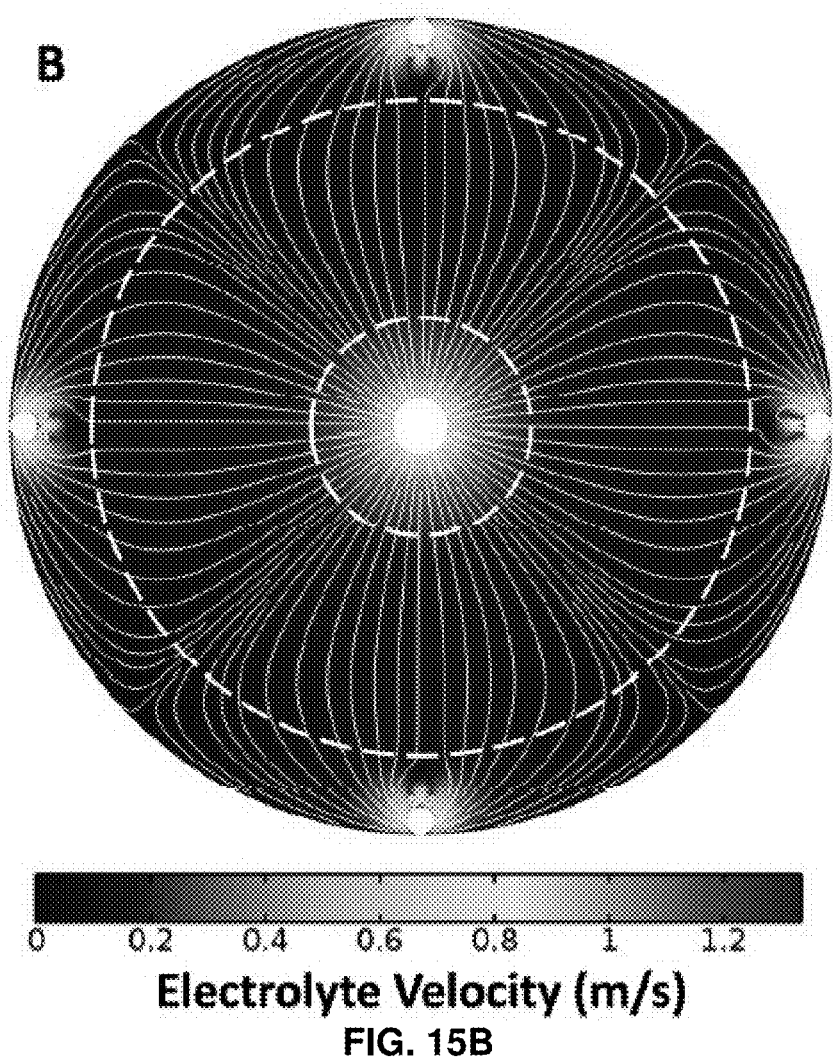
FIG. 15B shows a catholyte flow field in the working electrode chamber at a flow rate of 1 mL/min for convection driven by negative pressure applied at the outlet. The working electrode surface is denoted by the region between the dashed white lines.

The flow pattern and the average residence time of the catholyte in the working electrode were found to influence the cell performance and the liquid-phase product detectability. First, the convection of the catholyte driven by either a positive pressure applied at the cell inlet or a negative pressure applied at the cell outlet was examined. In the first case, the formation of recirculation eddies led to an increase in the holdup of gaseous product bubbles in the working electrode chamber, which caused erratic current flow due to the partial blockage of catholyte access to the electrode surface. These difficulties were eliminated when electrolyte convection was driven by negative pressure applied at the cell outlet. To support these observations the electrolyte velocity field across the working electrode chamber was simulated for convection driven by both positive and negative pressure (see SI-10). As shown in FIGS. 15A and 15B, the simulations confirm the existence of recirculation eddies in the case of electrolyte convection driven by positive pressure. However, these eddies do not form when electrolyte convection is driven by negative pressure. For this reason, negative pressure was employed to supply the electrolyte.

Figure 16:
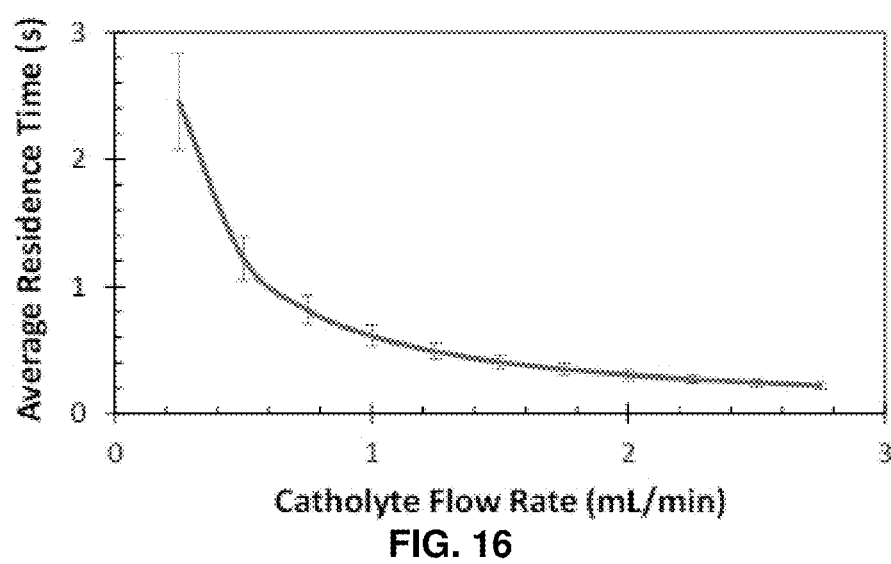
FIG. 16 shows an average residence time and distribution (error bars) of the catholyte in the working electrode chamber as a function of the electrolyte flow rate.

It is important that the average residence time of the electrolyte in the working electrode chamber be neither too short nor too long. Too short a residence time will lead to insufficient product accumulation in the electrolyte stream, thereby reducing the detectability of the products of interest. Conversely, too long a residence time will cause an accumulation of gaseous product bubbles in the working electrode chamber and a depletion of dissolved $CO_2$, which may result in mass transfer limitations. Ideally, the average residence time should be equivalent to the time interval over which mass spectrometry data will be acquired. To this end, the residence time distribution of the catholyte passing through the working electrode chamber and the transfer capillaries was calculated as a function of the flow rate by solving the Navier-Stokes and mass-balance equations in COMSOL Multiphysics v4.3b (see SI-10). As shown in FIG. 16, the calculations indicate that a flow rate of at least 0.5 mL/min is required to achieve an average residence time on the order of the analysis time of the mass spectrometer (~1.5 s). However, there is a wide standard deviation in the residence time at this flow rate, as indicated by the error bars, which reduces the accuracy of the liquid-phase product quantification. To reduce this uncertainty a minimum flow rate of 1 mL/min was selected. The maximum volumetric generation rate of gaseous products produced using polycrystalline copper was calculated to be less than 100 μL/min at potentials positive of −1.2 V vs RHE (see SI-11). Thus, there should be no issues with gaseous product accumulation inside the cell chambers at the minimum flow rate selected.

All gaseous $CO_2R$ products are detectable using DEMS except CO. CO is undetectable because its ionization produces the same mass fragments as $CO_2$, which is present in the electrolyte at a concentration at least three orders of magnitude higher than CO at the minimum electrolyte flow rate (see SI-12). To estimate the detection limit of the liquid-phase products, increasingly concentrated ethanol and 1-propanol solutions were fed into the cell at 1 mL/min. The limit of detection was defined as the concentration of these species that resulted in a mass ion current signal equal to the magnitude of the standard deviation of the baseline signal. By this means the liquid-phase product detection limit was determined to be ~5 μM (see SI-13). According to the current literature, the only liquid-phase products with generation rates high enough to reach this concentration at the minimum electrolyte flow rate are formic acid, ethanol, and 1-propanol (see SI-14). However, formic acid is undetectable since this species is fully dissociated, and hence cannot pervaporate into the mass spectrometer at the pH of the electrolyte. The inability to detect formic acid was verified experimentally using a formic acid solution two orders of magnitude more concentrated than expected to be observed during $CO_2R$ at the minimum electrolyte flow rate (see SI-15).

Only signal from the primary ionization fragment of ethanol and 1-propanol (m/z=31) was observable during $CO_2R$ over polycrystalline copper at the minimum electrolyte flow rate. This is an issue because cations with this m/z ratio are also produced by methanol, glycolaldehyde, ethylene glycol, allyl alcohol, and propionaldehyde. However, based on previous literature reports only ethanol and 1-propanol will contribute significantly to the m/z=31 signal, since the Faradaic efficiencies of the other products do not exceed 2% (see SI-16).[8,10] In principle, it should be possible to deconvolute the contributions to the m/z=31 signal made by ethanol and 1-propanol using the mass ion currents associated with their secondary ionization fragments. However, the secondary ionization fragment produced by ethanol (m/z=46) overlaps with that from $C^{12}O^{18}_2$, resulting in an erratic baseline that prevents clear trends from being observed (see SI-17). Furthermore, the concentration of 1-propanol expected to be formed by the reaction is insufficient to reach the detection limit of its secondary ionization fragment (m/z=59) (see SI-17). In order to determine the contribution of ethanol and 1-propanol to the m/z=31 signal their generation rates over polycrystalline copper were measured at a series of increasingly negative potentials in a conventional H-type cell. After electrolysis the composition of the catholyte was measured using HPLC and the relative concentration of ethanol to 1-propanol was plotted as a function of the applied potential (see SI-18). The linear relationship was then used to deconvolute the m/z=31 signal as a function of potential so that the generation rates of both alcohols could be determined in real time, assuming that they are both uniformly distributed in the catholyte entering the collection chamber.

Product Quantifiability

Figure 17A:
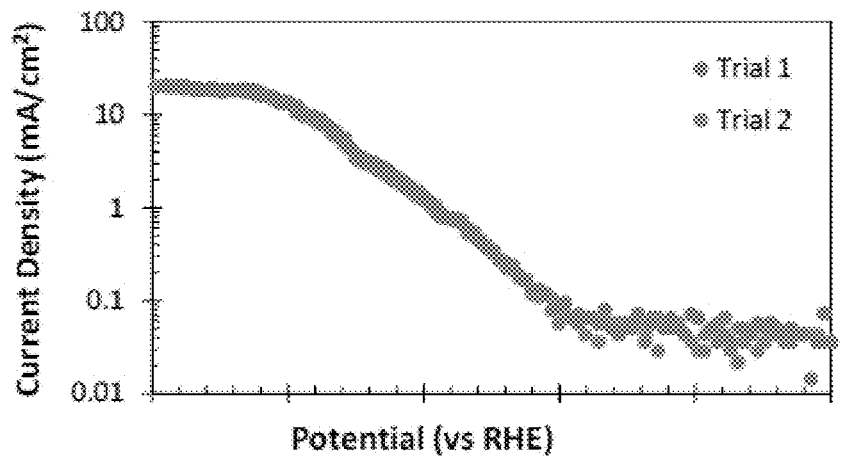
FIG. 17A shows DEMS results obtained in a He-sparged 0.05 M $K_2CO_3$ electrolyte (pH=11.3) using an electrolyte flow rate of 1 mL/min and a scan rate of 1 mV/s. Current density.
Figure 17B:
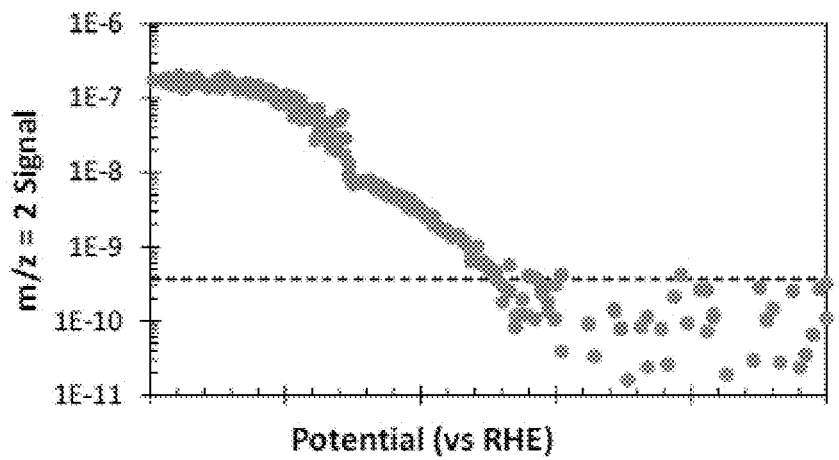
FIG. 17B shows DEMS results obtained in a He-sparged 0.05 M $K_2CO_3$ electrolyte (pH=11.3) using an electrolyte flow rate of 1 mL/min and a scan rate of 1 mV/s. m/z=2 signal.
Figure 17C:
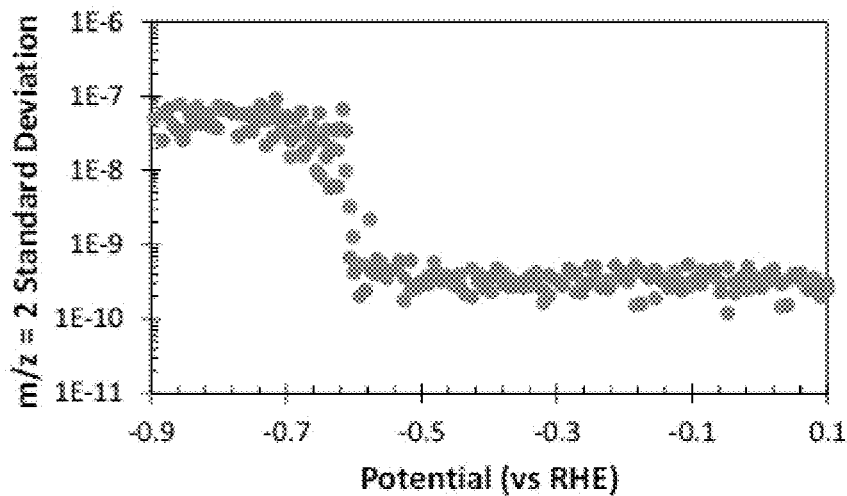
FIG. 17C shows DEMS results obtained in a He-sparged 0.05 M $K_2CO_3$ electrolyte (pH=11.3) using an electrolyte flow rate of 1 mL/min and a scan rate of 1 mV/s. m/z=2 standard deviation.
Figure 18:
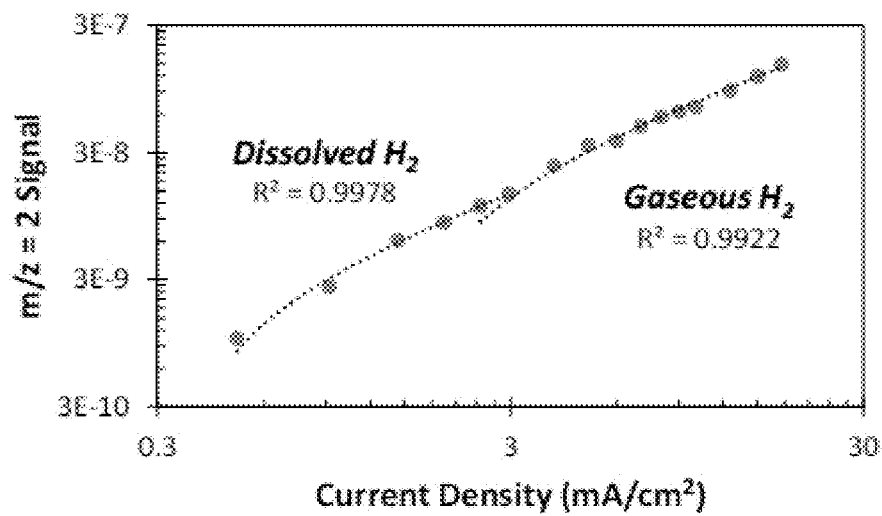
FIG. 18 shows a m/z=2 calibration curve for the case of a He-sparged electrolyte.
Figure 19A:
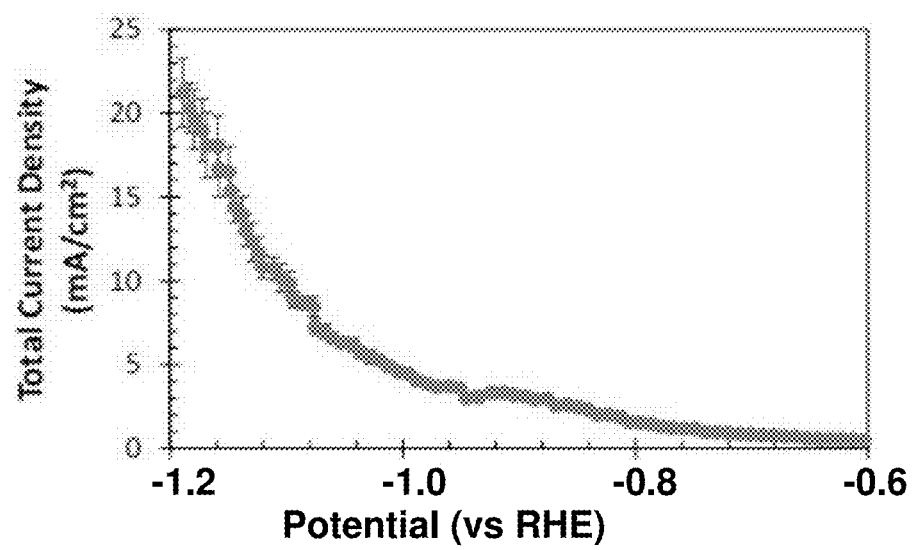
FIG. 19A shows DEMS results obtained in a $CO_2$-sparged 0.05 M $K_2CO_3$ electrolyte (pH=6.8) using an electrolyte flow rate of 1 mL/min and a scan rate of 0.2 mV/s.
Figure 19B:
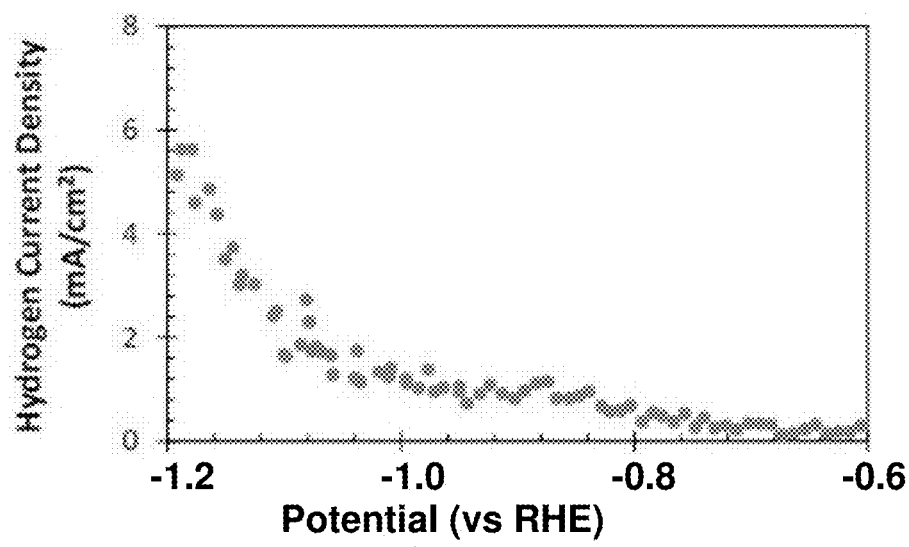
FIG. 19B shows DEMS results obtained in a $CO_2$-sparged 0.05 M $K_2CO_3$ electrolyte (pH=6.8) using an electrolyte flow rate of 1 mL/min and a scan rate of 0.2 mV/s.
Figure 19C:
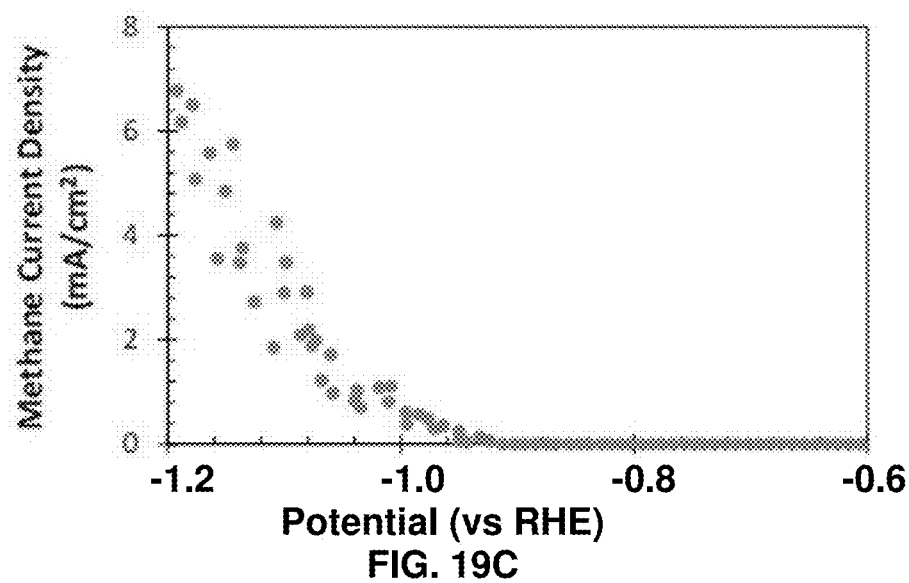
FIG. 19C shows DEMS results obtained in a $CO_2$-sparged 0.05 M $K_2CO_3$ electrolyte (pH=6.8) using an electrolyte flow rate of 1 mL/min and a scan rate of 0.2 mV/s.
Figure 19D:
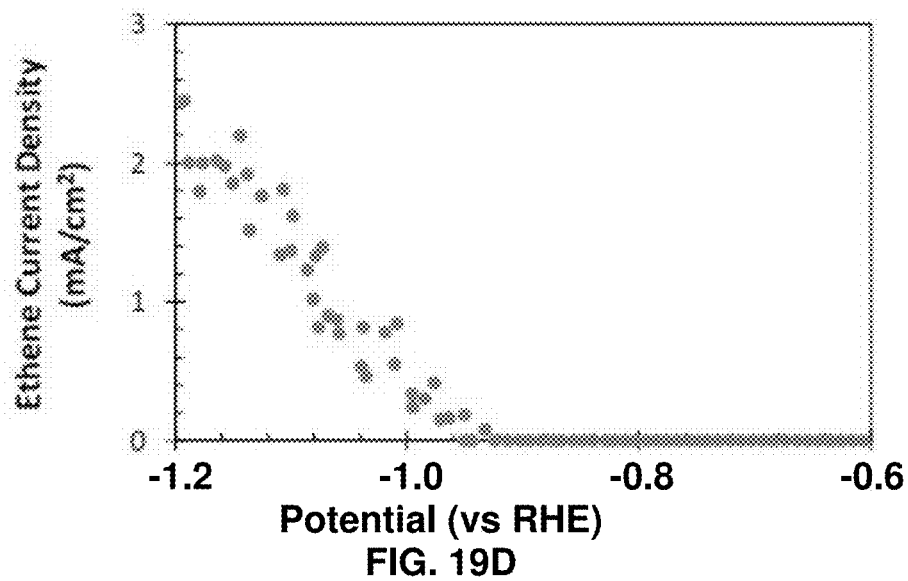
FIG. 19D shows DEMS results obtained in a $CO_2$-sparged 0.05 M $K_2CO_3$ electrolyte (pH=6.8) using an electrolyte flow rate of 1 mL/min and a scan rate of 0.2 mV/s.
Figure 19E:
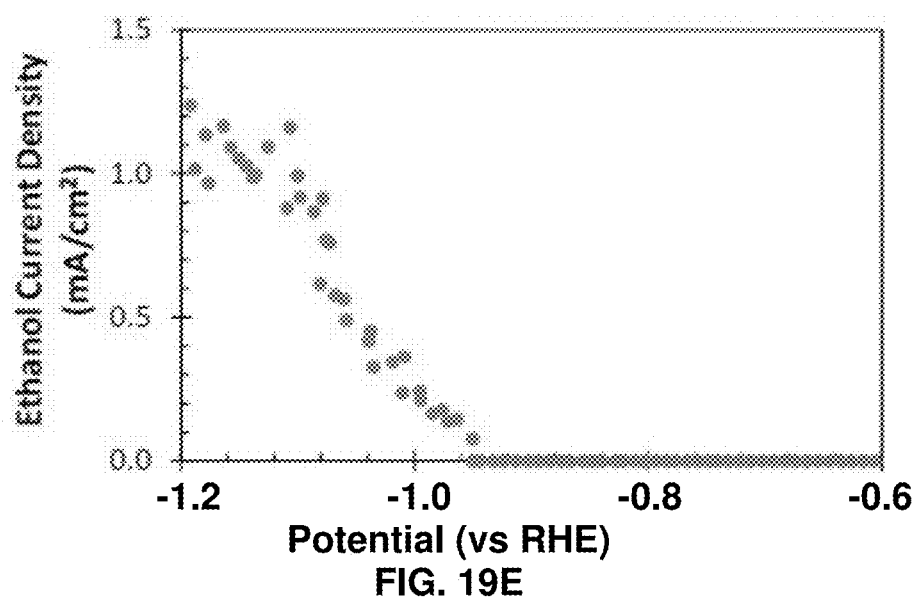
FIG. 19E shows DEMS results obtained in a $CO_2$-sparged 0.05 M $K_2CO_3$ electrolyte (pH=6.8) using an electrolyte flow rate of 1 mL/min and a scan rate of 0.2 mV/s.
Figure 19F:
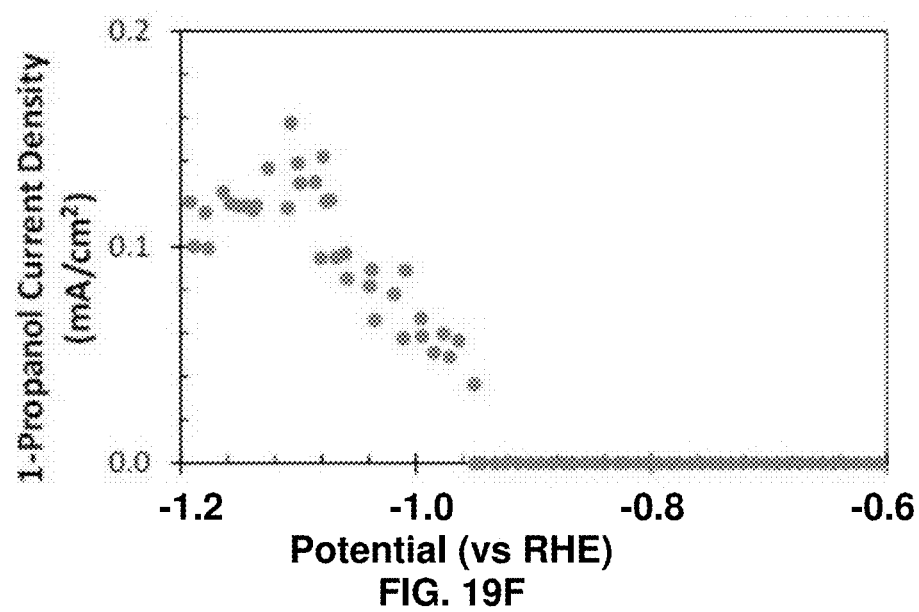
FIG. 19F shows DEMS results obtained in a $CO_2$-sparged 0.05 M $K_2CO_3$ electrolyte (pH=6.8) using an electrolyte flow rate of 1 mL/min and a scan rate of 0.2 mV/s.

Linear sweep voltammetry was conducted in a He-sparged electrolyte (pH=11.3) so that the ion current for m/z=2 could be related directly to the hydrogen generation rate. As shown in FIGS. 17A and 17B, the total current density and ion current for m/z=2 track each other as a function of potential under these conditions. This clearly demonstrates that a recorded mass ion current can be related directly to the generation rate of the corresponding product.[20] As shown in FIGS. 17B and 17C, a discontinuity in the m/z=2 signal response and a sudden increase in the standard deviation are observed at −0.6 V vs RHE. The current density corresponding to this potential was calculated to result in the saturation of the electrolyte with hydrogen (see SI-19). Thus, positive of −0.6 V vs RHE the hydrogen is entirely dissolved and hence no change is observed in the standard deviation of the ion current for m/z=2 versus the baseline standard deviation. However, at potentials negative of −0.6 V vs RHE the hydrogen saturates the electrolyte and forms bubbles, causing the sudden increase in the standard deviation of the ion current for m/z=2. Chronopotentiometry was conducted for 10 min at increasingly negative current densities in order to establish the m/z=2 calibration curve for the case of He-sparged electrolyte. As shown in FIG. 18, distinct calibration regimes were observed for dissolved and gaseous hydrogen. The signal response is greater for gaseous hydrogen because the collection efficiency of a gaseous product is higher than that of a dissolved product. Thus, it is imperative to use the standard deviation of the recorded mass ion currents to identify which phase the detected products are in so that accurate quantification can be performed.

Rapid Electrocatalyst Screening Via Linear Sweep Voltammetry

Linear sweep voltammetry was conducted in a $CO_2$-sparged electrolyte to demonstrate the ability of the DEMS cell to quantify the generation rates of multiple electrochemical reaction products in real time. The recorded voltammogram, shown in FIGS. 19A to 19F, closely matches that reported by Jaramillo et el.[10] at potentials positive of −1.2 V vs RHE, indicating that the cell geometry does not significantly impact the electrochemistry up to this potential. At potentials more negative than −1.2 V vs RHE a suppression in the current density is observed that is a result of inadequate gaseous product bubble clearing from the working electrode surface. At the potentials of gaseous product detection onset the standard deviations of the corresponding ion currents increased versus the standard deviation of the baselines (see SI-20). This pattern, which was absent for m/z=31, indicates that the detected gaseous products have phase segregated from the aqueous electrolyte at these potentials. Thus, the ion currents corresponding to the gaseous products were calibrated by introducing a standard gas containing hydrogen, methane, and ethene into the catholyte stream at a series of defined flow rates (see SI-21). This calibration methodology simulates the formation of gaseous product bubbles at the working electrode surface because the standard gas bubbles are completely removed from the catholyte stream in the collection chamber, enabling the mass ion current signals corresponding to the gaseous products to be directly related to the flux of the individual chemical species entering the collection chamber. The signal response for m/z=2 obtained using this approach matched the gaseous hydrogen calibration curve obtained electrochemically in a He-sparged electrolyte, indicating that this calibration methodology is accurate because it produces the same signal response that is observed electrochemically.

The partial current potential dependence of hydrogen, methane, ethene, ethanol, and 1-propanol recorded during the linear potential sweep are shown in FIGS. 19A to 19F. While the recorded data exhibit trends similar to those previously reported[8,10,33] (see SI-22) two major discrepancies exist: (1) the total current density is higher at potentials positive of the onset of hydrocarbon and alcohol detection and (2) the partial current densities of the $C_{2+}$ products do not decline at potentials negative of −1.1 V vs RHE. Both of these discrepancies can be explained by the use of electrolyte convection, which increases the $CO_2$ concentration and minimizes the $CO_2R$ product concentrations in the vicinity of the cathode. The adsorption of CO onto the copper surface is known to result in potential-dependent deactivation.[8,34,35] By minimizing the concentration of CO in the vicinity of the cathode, a higher CO desorption rate is achieved, which reduces the extent of CO poisoning at potentials positive of the onset of hydrocarbons and alcohols. Recent modeling efforts suggest that a significant increase in the pH and a depletion of dissolved $CO_2$ occur within the hydrodynamic boundary layer at the surface of a polycrystalline copper cathode at potentials negative of −1 V vs RHE despite vigorous electrolyte mixing.[36] These losses cause the measured electrocatalytic activity and selectivity to differ from those that would be observed in the absence of electrolyte polarization and mass-transfer limitations. The DEMS cell employed in this study minimizes these polarization and mass transfer effects by virtue of the continuous flow of electrolyte, which reduces the hydrodynamic boundary layer thickness and continuously supplies the electrode surface with $CO_2$. This is why the partial current densities of the $C_{2+}$ products do not decline at potentials more negative than −1.1 V vs RHE. This hypothesis is further supported by the suppression of HER observed at these potentials using the DEMS cell. Thus, the DEMS cell described here is superior to conventional mixed electrolyte cells for measuring intrinsic electrocatalytic activities and selectivities at high current densities.

Measuring Transient Selectivity via Chronoamperometry

Figure 20:
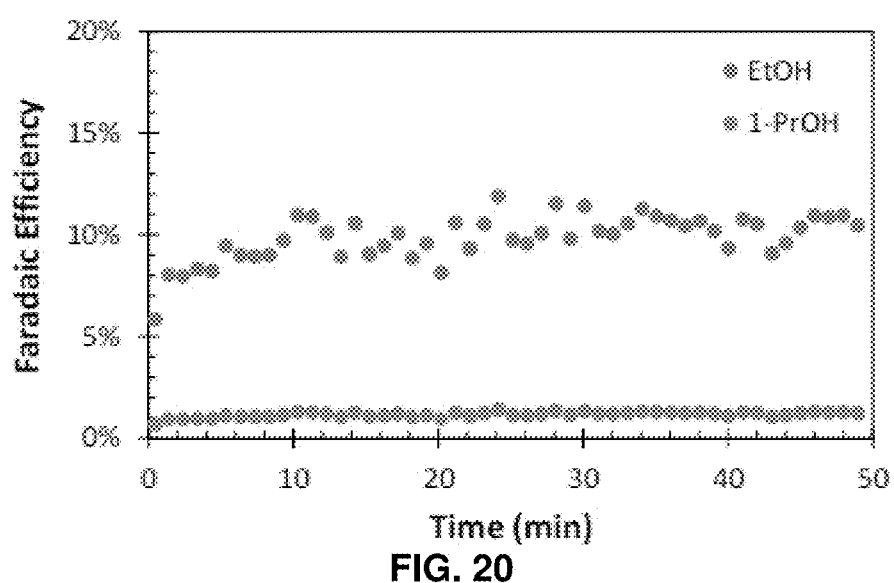
FIG. 20 shows Transient ethanol and 1-propanol Faradaic efficiencies recorded during chronoamperometry at −1.14 V vs RHE in a $CO_2$-sparged 0.05 M $K_2CO_3$ electrolyte (pH=6.8) using an electrolyte flow rate of 1 mL/min.

There have been no reports in the literature demonstrating changes in the selectivity of $CO_2R$ to $C_{2+}$ liquid-phase products as a function of time. This is an issue because the selectivity to $C_{2+}$ products has been reported to be extremely sensitive to the presence of impurities in the electrolyte, such as iron and zinc, that quickly contaminate the copper surface at the potentials required to drive $CO_2R$ to hydrocarbons and alcohols.[18,37] Currently, liquid product selectivity is quantified at the end of the reaction and it is assumed that no deactivation occurs over the course of ~1 h electrolysis. However, the validity of this assumption has not been substantiated experimentally due to the lack of an analytical technique capable of quantifying the transient generation rates of the $C_{2+}$ liquid-phase products in real time. To fill this void chronoamperometry was conducted at −1.14 V vs RHE for 1 h. As shown in FIG. 20, no substantial change in the ethanol or 1-propanol Faradaic efficiency was observed over the course of electrolysis. Furthermore, the Faradaic efficiencies of the other detectable reaction products were constant over the electrolysis period (see SI-23). These results suggest that deactivation of the copper electrode is not an issue as long as high purity reagents are used to prepare the electrolyte.

CONCLUSIONS

In conclusion, a DEMS cell has been designed that satisfies all of the criteria required to achieve meaningful product quantification in real time. These criteria include a parallel electrode configuration, high product collection efficiencies, and a rapid response time. The efficacy of the cell was demonstrated by performing $CO_2R$ over polycrystalline copper and quantifying the generation rates of both gaseous and liquid-phase products during a linear potential sweep and at a fixed potential as a function of time. To the best of our knowledge, this effort represents the first example of DEMS being used to quantify all major products of $CO_2R$, with the exception of CO and formic acid. The potential dependence of the partial current densities of the detectable reaction products matched the trends reported by other workers[8,10,33] but were obtained on the timescale of an hour rather than the tens of hours required using the conventional analytical approaches. It was also demonstrated that the copper electrocatalyst experiences no deactivation over the course of 1 h electrolysis at a fixed potential when pure reagents are used to prepare the electrolyte. This is the first time that the transient selectivity of $CO_2R$ to $C_{2+}$ liquid-phase products has been reported in the literature. The DEMS cell developed and described in this study is currently being used to screen the activity and selectivity of novel electrocatalysts as a function of potential and to investigate changes in their activity and selectivity over time.

REFERENCES CITED IN EXAMPLE 2 HEREIN (1) Jitaru, M.; Lowy, D. A.; Toma, M.; Toma, B. C.; Oniciu, L. *J. Appl. Electrochem.* 1997, 27, 875-889.

(2) Gattrell, M.; Gupta, N.; Co, A. *J. Electroanal. Chem.* 2006, 594, 1-19.

(3) Hori, Y. In *Modern Aspects of Electrochemistry*; Vayenas, C. G.; White, R. E.; Gamboa-Aldeco, M. E., Eds.; Springer: New York, 2008; pp. 89-189.

(4) Whipple, D. T.; Kenis, P. J. A. *J. Phys. Chem. Lett.* 2010, 1, 3451-3458.

(5) Hori, Y.; Kikuchi, K.; Suzuki, S. *Chem. Lett.* 1985, 1695-1698.

(6) Noda, H.; Ikeda, S.; Oda, Y.; Imai, K.; Maeda, M.; Ito, K. *Bull. Chem. Soc. Jpn.* 1990, 63, 2459-2462.

(7) Hori, Y.; Wakebe, H.; Tsukamoto, T.; Koga, O. *Electrochim. Acta* 1994, 39, 1833-1839.

(8) Hori, Y.; Murata, A.; Takahashi, R. *J. Chem. Soc. Faraday Trans.* 1 1989, 85, 2309-2326.

(9) Peterson, A. A.; Abild-Pedersen, F.; Studt, F.; Rossmeisl, J.; Nørskov, J. K. *Energy Environ. Sci.* 2010, 3, 1311-1315.
(10) Kuhl, K. P.; Cave, E. R.; Abram, D. N.; Jaramillo, T. F. *Energy Environ. Sci.* 2012, 5, 7050-7059.
(11) Tang, W.; Peterson, A. a; Varela, A. S.; Jovanov, Z. P.; Bech, L.; Durand, W. J.; Dahl, S.; Nørskov, J. K.; Chorkendorff, I. *Phys. Chem. Chem. Phys.* 2012, 14, 76-81.
(12) Dewulf, D. W.; Tuo, J.; Bard, A. J. *J. Electrochem. Soc.* 1989, 136, 1686-1691.
(13) Wasmus, S.; Cataneo, E.; Vielstich, W. *Electrochim. Acta* 1990, 35, 711-715.
(14) Kyriacou, G.; Anagnostopoulos, A. J. *Electroanal. Chem.* 1992, 322, 233-246.
(15) Shiratsuch, R.; Aikoh, Y.; Nogami, G. *J. Electrochem. Soc.* 1993, 140, 3479-3482.
(16) Friebe, P.; Bogdanoff, P.; Alonso-Vante, N.; Tributsch, H. *J. Catal.* 1997, 168, 374-385.
(17) Lee, J.; Tak, Y. *Electrochim. Acta* 2001, 46, 3015-3022.
(18) Hori, Y.; Konishi, H.; Futamura, T.; Murata, A.; Koga, O.; Sakurai, H.; Oguma, K. *Electrochim. Acta* 2005, 50, 5354-5369.
(19) Kwon, Y.; Koper, M. T. M. *Anal. Chem.* 2010, 82, 5420-5424.
(20) Wolter, O.; Heitbaum, J. Berichte der Bunsengesellschaft für Phys. Chemie 1984, 88, 2-6.
(21) Wonders, A. H.; Housmans, T. H. M.; Rosca, V.; Koper, M. T. M. *J. Appl. Electrochem.* 2006, 36, 1215-1221.
(22) Grote, J.; Zeradjanin, A. R.; Cherevko, S.; Mayrhofer, K. J. J.; Grote, J.; Zeradjanin, A. R.; Cherevko, S.; Mayrhofer, K. J. J. *Rev. Sci. Instrum.* 2014, 85.
(23) Ashton, S. J. Design, Construction, and Research Application of a Differential Electrochemical Mass Spectrometer (DEMS); Springer: Heidelberg, 2012; pp. 1-111.
(24) Baltruschat, H. *J. Am. Soc. Mass Spectrom.* 2004, 15, 1693-1706.
(25) Jusys, Z.; Massong, H.; Baltruschat, H. *J. Electrochem. Soc.* 1999, 146, 1093-1098.
(26) Schouten, K. J. P.; Kwon, Y.; van der Ham, C. J. M.; Qin, Z.; Koper, M. T. M. *Chem.*
Sci. 2011, 2, 1902-1909.
(27) Schouten, K. J. P.; Qin, Z.; Perez Gallent, E.; Koper, M. T. M. *J. Am. Chem. Soc.* 2012, 134, 9864-9867.
(28) Schouten, K. J. P.; Pe, E.; Koper, M. T. M. *ACS Catal.* 2013, 3, 1292-1295.
(29) Schouten, K. J. P.; Pérez Gallent, E.; Koper, M. T. M. *J. Electroanal. Chem.* 2013, 716, 53-57.
(30) Kortlever, R.; Tan, K. H.; Kwon, Y.; Koper, M. T. M. *J. Solid State Electrochem.* 2013, 17, 1843-1849.
(31) Reske, R.; Duca, M.; Oezaslan, M.; Schouten, K. J. P.; Koper, M. T. M.; Strasser, P. *J. Phys. Chem. Lett.* 2013, 4, 2410-2413.
(32) Kas, R.; Kortlever, R.; Milbrat, A.; Koper, M. T. M.; Mul, G.; Baltrusaitis, J. *Phys. Chem. Chem. Phys.* 2014, 16, 12194-12201.
(33) Noda, H.; Ikeda, S.; Oda, Y.; Ito, K. *Chem. Lett.* 1989, 2, 289-292.
(34) Hori, Y.; Murata, A.; Yoshinami, Y. *J. Chem. Soc. Faraday Trans.* 1 1991, 87, 125-128.
(35) Hori, Y.; Takahashi, R.; Yoshinami, Y.; Murata, A. *J. Phys. Chem. B* 1997, 101, 7075-7081.
(36) Singh, M. R.; Clark, E. L.; Bell, A. T. *Phys. Chem. Chem. Phys.* 2015.
(37) Hori, Y.; Kikuchi, K.; Murata, A.; Suzuki, S. *Chem. Lett.* 1986, 6, 897-898.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A differential electrochemical mass spectrometry (DEMS) cell, comprising:
 a body, the body defining an anolyte chamber, a catholyte chamber, and a collection chamber;
 an ion-conducting membrane separating the anolyte chamber and the catholyte chamber;
 a counter electrode disposed in the anolyte chamber;
 a working electrode disposed in the catholyte chamber, the working electrode being a washer-shaped electrode and a channel being defined in a center of the working electrode, the channel functioning as an inlet for catholyte to the catholyte chamber; and
 a pervaporation membrane, a first surface of the pervaporation membrane defining a portion of the collection chamber, and the collection chamber being in fluid communication with the catholyte chamber.

2. The DEMS cell of claim 1, wherein the catholyte chamber has a cylindrical shape, wherein a plurality of down channels are defined in the body between the catholyte chamber and the collection chamber, and wherein an inlet for the catholyte for each of the plurality of down channels is defined in the cathode chamber along a diameter of the catholyte chamber.

3. The DEMS cell of claim 2, wherein the plurality of down channels defined in the body between the catholyte chamber and the collection chamber consists of four down channels, and wherein the inlet for each of the four down channels is positioned symmetrically about the diameter of the catholyte chamber.

4. The DEMS cell of claim 2, wherein the catholyte is operable to flow into the catholyte chamber through the channel, to flow outwards from the center of the working electrode to the inlets of the plurality of down channels, and to flow into the collection chamber.

5. The DEMS cell of claim 1, wherein anolyte is operable to flow into the anolyte chamber, to flow along a surface of the ion-conducting membrane, and to flow out of the anolyte chamber.

6. The DEMS cell of claim 1, wherein the counter electrode comprises platinum.

7. The DEMS cell of claim 1, wherein a surface area of the counter electrode is about 2 $cm^2$.

8. The DEMS cell of claim 1, wherein the ion-conducting membrane comprises a proton conducting membrane.

9. The DEMS cell of claim 1, wherein a surface area of the ion-conducting membrane between the working electrode and the counter electrode is about 1.75 $cm^2$.

10. The DEMS cell of claim 1, wherein a distance between the working electrode and the ion-conducting membrane is about 10 microns to 200 microns.

11. The DEMS cell of claim 1, wherein a volume of the catholyte chamber is less than about 40 microliters.

12. The DEMS cell of claim 1, wherein the working electrode comprises copper.

13. The DEMS cell of claim 1, wherein a surface area of the working electrode is about 0.5 $cm^2$ to 2 $cm^2$.

14. The DEMS cell of claim 1, further comprising:
a screw, wherein the screw passes through the channel and connects the working electrode to the body, and wherein the screw defines a second channel through which the catholyte is operable to flow into the catholyte chamber.

15. The DEMS cell of claim 1, wherein the counter electrode defines a flat surface, and wherein the working electrode and the flat surface of the counter electrode are parallel.

16. The DEMS cell of claim 1, wherein the pervaporation membrane comprises polytetrafluoroethylene (PTFE).

17. The DEMS cell of claim 1, further comprising:
a stainless steel frit, wherein the stainless steel frit is in contact with a second surface of the pervaporation membrane.

18. The DEMS cell of claim 1, further comprising:
a reference electrode disposed in the catholyte chamber.

19. The DEMS cell of claim 18, wherein the reference electrode is positioned about 1 millimeter from the working electrode.

\* \* \* \* \*